(12) United States Patent
Takahashi et al.

(10) Patent No.: US 12,355,564 B2
(45) Date of Patent: Jul. 8, 2025

(54) COMMUNICATION DEVICE, COMMUNICATION METHOD, AND COMMUNICATION SYSTEM

(71) Applicant: SONY GROUP CORPORATION, Tokyo (JP)

(72) Inventors: Mitsuki Takahashi, Tokyo (JP); Hiroki Matsuda, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/551,408

(22) PCT Filed: Feb. 2, 2022

(86) PCT No.: PCT/JP2022/003937
§ 371 (c)(1),
(2) Date: Sep. 20, 2023

(87) PCT Pub. No.: WO2022/209257
PCT Pub. Date: Oct. 6, 2022

(65) Prior Publication Data
US 2024/0195525 A1    Jun. 13, 2024

(30) Foreign Application Priority Data

Mar. 31, 2021    (JP) .................. 2021-059659

(51) Int. Cl.
*H04L 1/00* (2006.01)
*H04L 1/22* (2006.01)

(52) U.S. Cl.
CPC .......... *H04L 1/0041* (2013.01); *H04L 1/0045* (2013.01); *H04L 1/22* (2013.01)

(58) Field of Classification Search
CPC ............ H03M 13/09; H03M 13/2906; H03M 13/251; H04L 1/0057; H04L 1/0041;
(Continued)

(56) References Cited

U.S. PATENT DOCUMENTS 8,667,362 B2 * 3/2014 Currivan ........... H03M 13/2707
714/755
2002/0080802 A1 * 6/2002 Sachs .................... H04L 1/1621
370/329
(Continued)

FOREIGN PATENT DOCUMENTS

EP        3073661 A1    9/2016
JP    2004-517534 A    6/2004
(Continued)

OTHER PUBLICATIONS

International Search Report and Written Opinion of PCT Application No. PCT/JP2022/003937, issued on Apr. 19, 2022, 09 pages of ISRWO.
(Continued)

*Primary Examiner* — Cynthia Britt
(74) *Attorney, Agent, or Firm* — CHIP LAW GROUP

(57) ABSTRACT

A communication device performs radio communication by using a plurality of channels, and includes: a generation unit that generates a plurality of bit sequences having different contents by applying predetermined coding processing based on a predetermined error correction coding method to a transmission data sequence; and a distribution unit that distributes the plurality of bit sequences to the plurality of channels.

18 Claims, 21 Drawing Sheets

(58) Field of Classification Search
CPC ... H04L 1/0009; H04L 1/1812; H04L 1/0051; H04L 1/0045; H04L 1/22
See application file for complete search history.

(56) References Cited

U.S. PATENT DOCUMENTS

| | | | | |
|---|---|---|---|---|
| 2009/0175367 | A1* | 7/2009 | Kishigami | H04L 27/2675 375/347 |
| 2012/0159282 | A1* | 6/2012 | Ito | H03M 13/098 714/752 |
| 2017/0041100 | A1* | 2/2017 | Xie | H04L 1/0076 |
| 2017/0156131 | A1* | 6/2017 | Kimura | H04W 72/04 |
| 2019/0357196 | A1 | 11/2019 | Majmundar | |
| 2023/0198664 | A1* | 6/2023 | Matsuda | H04L 1/00 714/752 |

FOREIGN PATENT DOCUMENTS

| | | |
|---|---|---|
| JP | 2016-139862 A | 8/2016 |
| JP | 2017-502595 A | 1/2017 |
| WO | 2020/166229 A1 | 8/2020 |

OTHER PUBLICATIONS

"Packet Data Convergence Protocol (PDCP) specification", 3GPP TS 38.323, Version 16.2.0, Release 16, Nov. 2020, 42 pages.

"Use cases and options for network coding in IAB", Intel Corporation, AT&T, Deutsche Telekom, 3GPP TSG RAN Meeting #86, RP-193077, Dec. 9-12, 2019, 8 pages.

Maciej Kurant: "Exploiting the Path Propagation Time Differences in Multipath Transmission with FEC", IEEE Journal on Selected Areas in Communications, May 1, 2011 (May 1, 2011), vol. 29, No. 5, pp. 1021-1031, XP011354521.

* cited by examiner

FIG.21

SIMULATION SPECIFICATIONS

| | CONVENTIONAL METHOD | PROPOSED METHOD |
|---|---|---|
| UPPER LAYER PROCESSING | BLOCK DUPLICATION (BIT BLOCK UNIT CORRECTION) | Raptor CODE PARITY SELECTION: RANDOM OTHERS: COMPLIANT WITH IETF RFC 5053 |
| DATA UNIT | 10 BIT BLOCK/DATA UNIT | |
| NUMBER OF BITS IN BIT BLOCK | 10 bit/BIT BLOCK | |
| CHANNEL ERASURE RATE | 1.048%/BIT BLOCK (10%/DATA UNIT) 0.01%/BIT BLOCK (0.1%/DATA UNIT) | |

COMMUNICATION DEVICE, COMMUNICATION METHOD, AND COMMUNICATION SYSTEM

CROSS REFERENCE TO RELATED APPLICATIONS

This application is a U.S. National Phase of International Patent Application No. PCT/JP2022/003937 filed on Feb. 2, 2022, which claims priority benefit of Japanese Patent Application No. JP 2021-059659 filed in the Japan Patent Office on Mar. 31, 2021. Each of the above-referenced applications is hereby incorporated herein by reference in its entirety.

FIELD

The present disclosure relates to a communication device, a communication method, and a communication system.

BACKGROUND

Communication with high communication performance (e.g., high reliability, low delay, and high frequency utilization efficiency) capable of addressing various use cases is required. For example, in 5G of the next generation communication standard, ultra-reliable and low latency communication (URLLC) is defined in order to address various use cases. In the URLLC, technology called packet duplication that achieves high reliability by using a plurality of independent channels may be used.

CITATION LIST

Non Patent Literature

Non Patent Literature 1: 3GPP TS 38.323 v16.2.0 (2020 September) Packet Data Convergence Protocol (PDCP) specification (Release 16)
Non Patent Literature 2: 3GPP RP-193077, "Use cases and options for network coding in IAB", AT&T

SUMMARY

Technical Problem

Introducing certain technology may improve certain communication performance in a certain degree while the introduction may remarkably deteriorate other communication performance. For example, although the above-described example of the packet duplication improves communication reliability, frequency utilization efficiency is remarkably reduced since the same data is transmitted through a plurality of channels. It cannot necessarily be said in this situation that the high communication performance has been achieved.

Thus, the present disclosure proposes a communication device, a communication method, and a communication system that can achieve high communication performance.

Note that the above-described problem or object is merely one of a plurality of problems or objects that can be solved or achieved by a plurality of embodiments disclosed in the present specification.

Solution to Problem

In order to solve the above problem, a communication device according to one embodiment of the present disclosure that performs radio communication by using a plurality of channels, the communication device includes: a generation unit that generates a plurality of bit sequences having different contents by applying coding processing based on a predetermined error correction coding method to a transmission data sequence; and a distribution unit that distributes the plurality of bit sequences to the plurality of channels.

BRIEF DESCRIPTION OF DRAWINGS

FIG. 21 illustrates specifications of the simulation.

DESCRIPTION OF EMBODIMENTS

Figure 1:
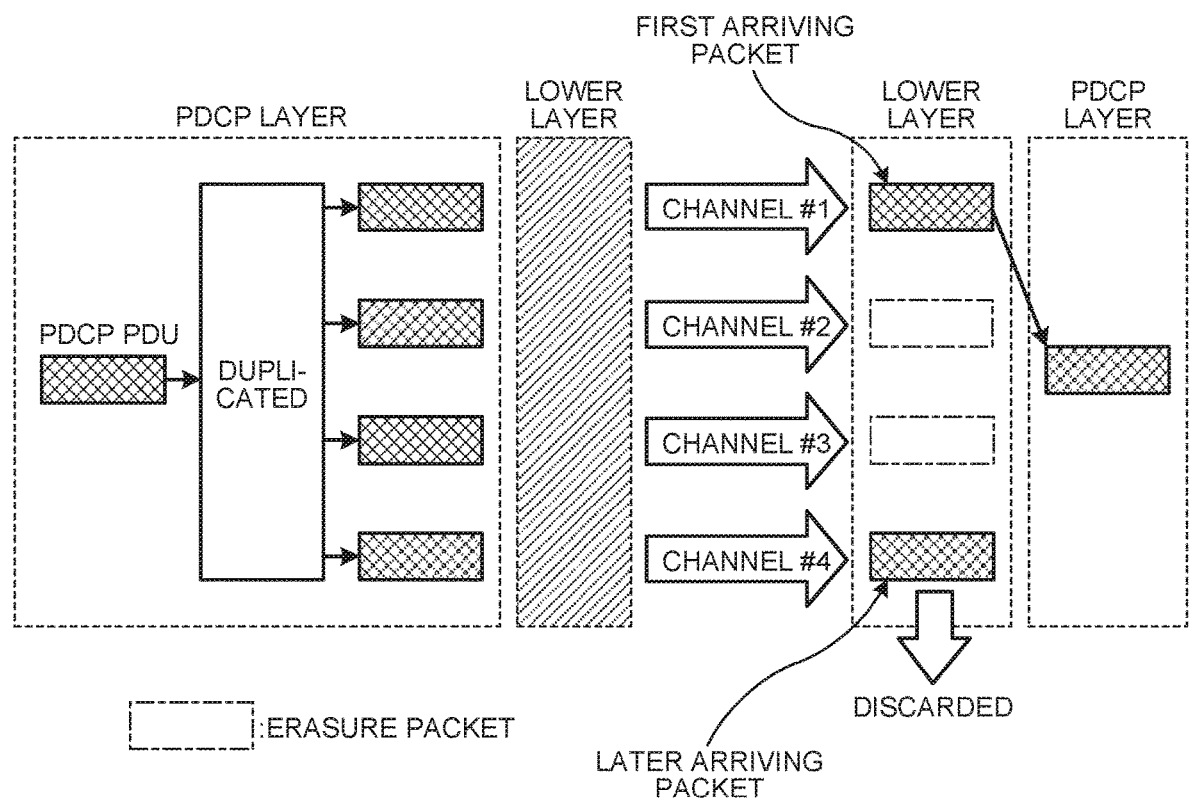
FIG. 1 illustrates PDCP duplication.

An embodiment of the present disclosure will be described in detail below with reference to the drawings. Note that, in the following embodiment, the same reference signs are attached to the same parts to omit duplicate description.

Furthermore, in the present specification and the drawings, a plurality of components having substantially the same functional configuration may be distinguished by attaching different numbers after the same reference signs. For example, a plurality of configurations having substantially the same functional configuration is distinguished as terminal devices 401, 402, and 403, as necessary. Note, however, that, when it is unnecessary to particularly distinguish a plurality of components having substantially the same functional configuration, only the same reference signs are attached. For example, when it is not necessary to particularly distinguish the terminal devices 401, 402, and 403, the terminal devices 401, 402, and 403 are simply referred to as terminal devices 40.

One or a plurality of embodiments (including examples and variations) to be described below can be implemented independently. In contrast, at least a part of the plurality of embodiments to be described below may be appropriately combined with at least a part of other embodiments. The plurality of embodiments may include different novel features. Therefore, the plurality of embodiments may contribute to solving different objects or problems, and may exhibit different effects.

1. Outline

Radio access technology (RAT) such as long term evolution (LTE) and new radio (NR) has been studied in the 3rd generation partnership project (3GPP). The LTE and the NR are types of cellular communication technology, and enable mobile communication of a terminal device by arranging a plurality of areas covered by a base station in a cell shape. In this case, a single base station may manage a plurality of cells.

Note that, in the following description, the "LTE" includes LTE-Advanced (LTE-A), LTE-Advanced Pro (LTE-A Pro), and evolved universal terrestrial radio access (E-UTRA). Furthermore, the NR includes new radio access technology (NRAT) and further E-UTRA (FE-UTRA). In the following description, a cell that supports the LTE is referred to as an LTE cell, and a cell that supports the NR is referred to as an NR cell.

The NR is a next generation (fifth generation) radio access technology (RAT) of LTE. The NR is radio access technology that can support various use cases including enhanced mobile broadband (eMBB), massive machine type communications (mMTCs), and ultra-reliable and low latency communications (URLLCs). The NR has been studied aiming at a technical framework that supports utilization scenarios, requirement conditions, arrangement scenarios, and the like in these use cases.

In recent years, further improvement in communication performance (e.g., further increase in capacity, increase in speed, decrease in delay, increase in reliability, decrease in power consumption, and decrease in processing load) has been desired. Although various pieces of technology are used to achieve high communication performance, the high communication performance cannot necessarily be achieved only by using conventional technology as it is.

Hereinafter, examples of the conventional technology include packet data convergence protocol (PDCP) duplication described in Non Patent Literature 1 (3GPP TS 38.323 version 16.2.0 Release 16) and erasure code application technology for a plurality of data units described in Non Patent Literature 2 (3GPP RP-193077).

(1) PDCP Duplication

First, PDCP duplication will be described. FIG. 1 illustrates the PDCP duplication. The PDCP duplication is technology for improving communication reliability defined in a PDCP layer. The PDCP duplication is a type of packet duplication.

In the PDCP duplication, a communication device duplicates a data unit to transmit the same data unit to a plurality of independent channels. The communication device transmits the duplicated data units by using the plurality of independent channels. Here, technology of simultaneously using a plurality of independent communication paths (channels) at the time when a base station communicates with a single terminal, such as dual connectivity and carrier aggregation, is known as the technology of using a plurality of independent channels. These pieces of technology mainly have two objects. One is to achieve large-capacity communication by expanding communication capacity with a plurality of independent communication paths. The other is to improve communication reliability by achieving spatial diversity with a plurality of communication paths. The PDCP duplication is used in communications using a plurality of independent channels for improving reliability.

In contrast, a disadvantage of the PDCP duplication lies in frequency utilization efficiency. For example, in the PDCP duplication, when one of pieces of the same data sent from independent channels can be correctly received, all pieces of data sent from the remaining channels are discarded regardless of communication success. Here, it is assumed that the coding rate of the PDCP layer or a lower layer is constant for each channel and the channel capacity is also constant. Then, under this assumption, frequency utilization efficiency in a case where the PDCP duplication is used is compared with that in a case where the PDCP duplication is not used. Then, it can be seen that, when the PDCP duplication is used, N times as many frequency resources as those in a case where the PDCP duplication is not used are used. Here, N is the number of independent channels used for communication.

Reception processing performed in the PDCP duplication has poor decoding gain and remarkably low frequency utilization efficiency as compared with that performed in a method of adding likelihoods such as hybrid automatic repeat request (HARQ) and coding technology of correcting an error by using parity. That is, when the PDCP duplication is used, communication reliability is improved while frequency utilization efficiency is remarkably reduced. Therefore, it cannot necessarily be said that high communication performance is achieved by using the PDCP duplication.

(2) Erasure Code Application Technology for Plurality of Data Units

Figure 2:
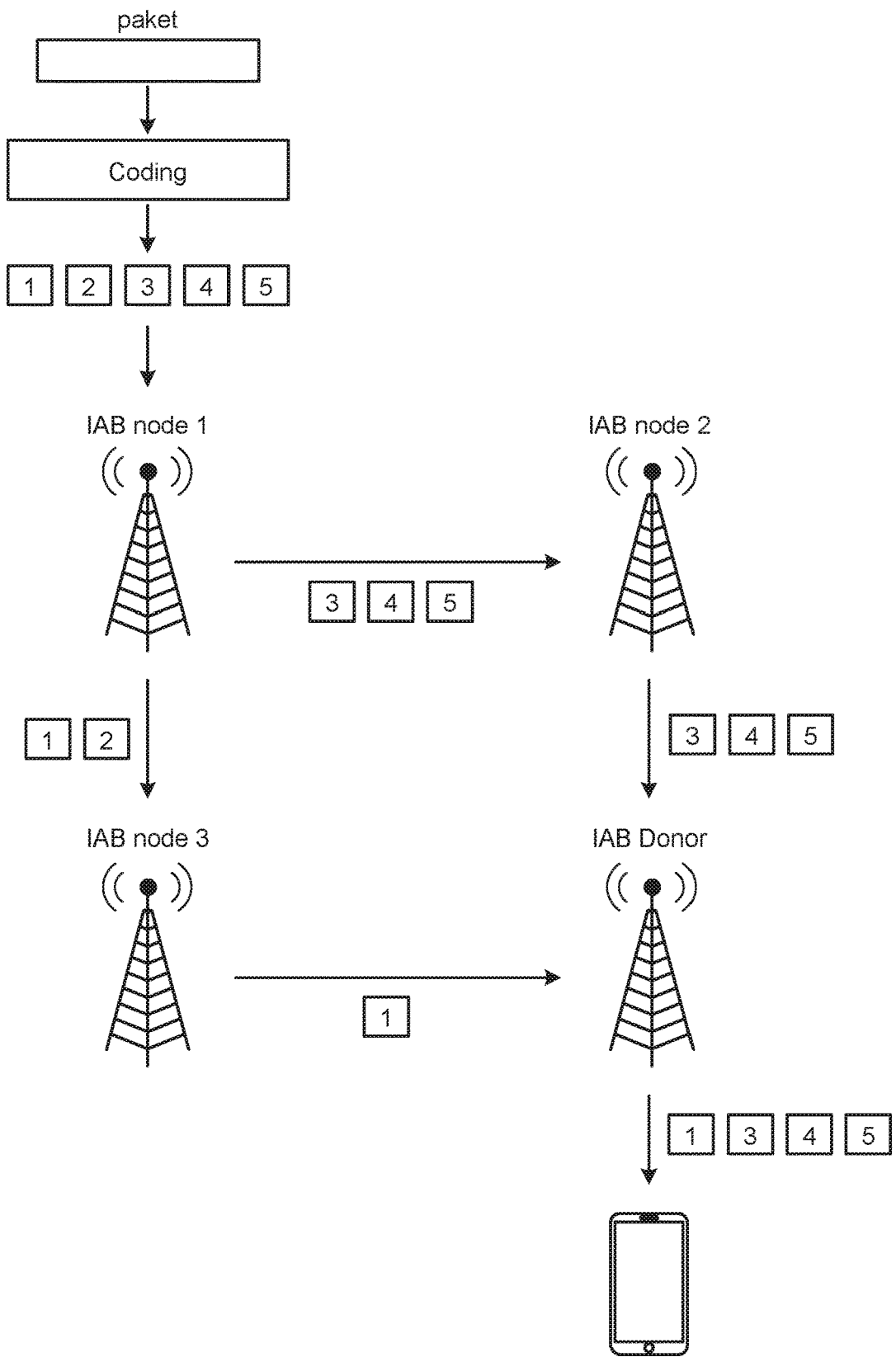
FIG. 2 illustrates an example of application of network coding in an IAB region.

Next, the erasure code application technology for a plurality of data units will be described. Non Patent Literature 2 describes application of network coding in integrated access and backhaul (IAB). The network coding here refers to, for example, coding of a packet with a predetermined erasure code. FIG. 2 illustrates an example of application of network coding in an IAB region. In the example of FIG. 2, a plurality of IAB nodes constitute a path for transmitting data to an IAB donor. In the example of FIG. 2, an IAB node 1 that has received coded data distributes and transmits the data to a plurality of paths. The distributed data is aggregated in a single IAB donor. Then, data transmission between a base station (IAB donor) and a terminal (UE) is started.

In Non Patent Literature 2, the IAB donor communicates with the UE by using a single channel. Patent Literature 2 assumes coding just in the IAB region. Furthermore, Non Patent Literature 2 does not describe any specific distribution method or lower layer processing. Therefore, it cannot necessarily be said that high communication performance is achieved in a case where the technology described in Non Patent Literature 2 is used.

Thus, in the embodiment, the problem is solved by the following means.

The communication device (e.g., base station and terminal device) of the embodiment performs radio communication by using a plurality of channels. The communication device generates a plurality of bit sequences having different contents by applying predetermined coding processing based on a predetermined error correction coding method to a transmission data sequence. Then, the communication device distributes and transmits the plurality of bit sequences to the plurality of channels. This enables the communication device of the embodiment to achieve high frequency utilization efficiency while maintaining communication reliability.

Although the embodiment has been outlined above, a communication system according to the embodiment will be described in detail below.

2. Configuration of Communication System

A configuration of a communication system 1 will be specifically described below with reference to the drawings.

2-1. Overall Configuration of Communication System

Figure 3:
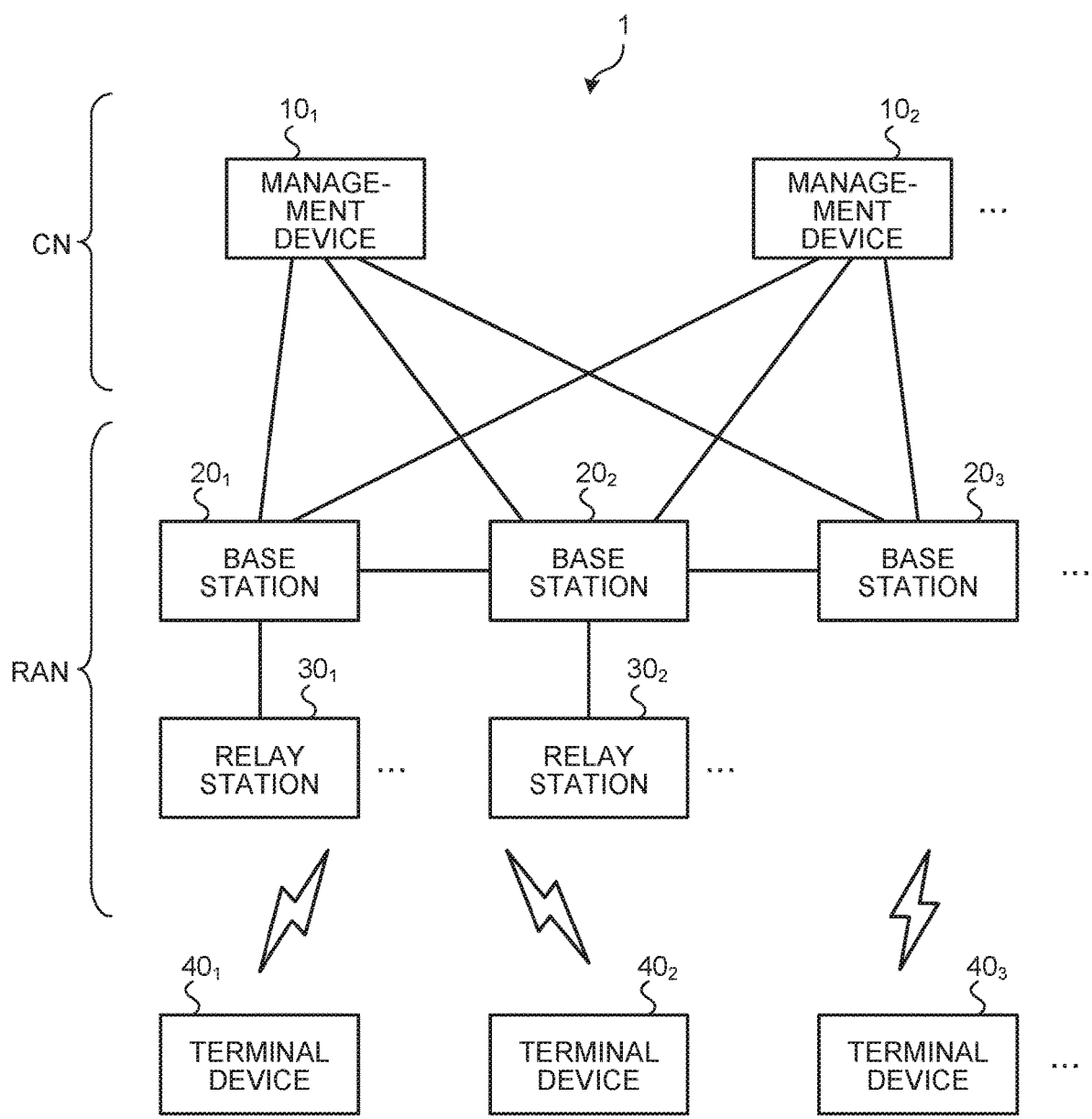
FIG. 3 illustrates a configuration example of a communication system according to an embodiment of the present disclosure.

FIG. 3 illustrates a configuration example of the communication system 1 according to the embodiment of the present disclosure. The communication system 1 includes a management device 10, a base station 20, a relay station 30, and the terminal device 40. The communication system 1 provides a radio network that enables mobile communication to a user by radio communication devices constituting the communication system 1 operating in cooperation. The radio network of the embodiment includes, for example, a radio access network and a core network. Note that, in the embodiment, the radio communication devices have a function of radio communication. In the example of FIG. 3, the base station 20, the relay station 30, and the terminal device 40 correspond to the radio communication devices.

The communication system 1 may include a plurality of management devices 10, a plurality of base stations 20, a plurality of relay stations 30, and a plurality of terminal devices 40. In the example of FIG. 3, the communication system 1 includes management devices 101 and 102 and the like serving as the management devices 10, and includes base stations 201 and 202 and the like serving as the base stations 20. Furthermore, the communication system 1 includes relay stations 301 and 302 and the like as the relay stations 30, and includes terminal devices 401, 402, and 403 and the like serving as the terminal devices 40.

Note that the devices in the figure may be considered as devices in a logical sense. That is, parts of devices in the figure may be achieved by a virtual machine (VM), a container, a docker, and the like, and implemented on physically the same hardware.

Note that the communication system 1 may support radio access technology (RAT) such as long term evolution (LTE) and new radio (NR). The LTE and the NR are types of cellular communication technology, and enable mobile communication of a terminal device by arranging a plurality of areas covered by a base station in a cell shape.

Note that a radio access method used by the communication system 1 is not limited to the LTE and the NR, and may include other radio access methods such as wideband code division multiple access (W-CDMA) and code division multiple access 2000 (cdma2000).

Furthermore, the base station or the relay station constituting the communication system 1 may be a ground station or a non-ground station. The non-ground station may be a satellite station or an aircraft station. When the non-ground station is a satellite station, the communication system 1 may be a bent-pipe (transparent) type mobile satellite communication system.

Note that, in the embodiment, the ground station (also referred to as ground base station) refers to a base station (including relay station) installed on the ground. Here, "on the ground" has a broad sense including not only on the land but in the ground, on water, and under water. Note that, in the following description, the description of "ground station" may be replaced with "gateway".

Note that a base station of the LTE may be referred to as an evolved node B (eNodeB) or an eNB. Furthermore, a base station of the NR may be referred to as a gNodeB or a gNB. Furthermore, in the LTE and the NR, a terminal device (also referred to as mobile station or terminal) may be referred to as user equipment (UE). Note that the terminal device is a type of communication device, and is also referred to as a mobile station or a terminal.

In the embodiment, the concept of the communication device includes not only a portable moving object device (terminal device) such as a mobile terminal but a device installed in a structure or a moving object. The structure or the moving object itself may be regarded as the communication device. Furthermore, the concept of the communication device includes not only the terminal device but the base station and the relay station. The communication device is a type of processing device and information processing device. Furthermore, the communication device can be rephrased as a transmission device or a reception device.

A configuration of each device constituting the communication system 1 will be specifically described below. Note that the configuration of each device described below is merely one example. The configuration of each device may be different from the following configuration.

2-2. Configuration of Management Device

Next, the configuration of the management device 10 will be described.

The management device 10 manages a radio network. For example, the management device 10 manages communication of the base station 20. The management device 10 may have a function of, for example, a mobility management entity (MME). The management device 10 may have a function of an access and mobility management function (AMF) and/or a session management function (SMF). Of course, the function of the management device 10 is not limited to the MME, the AMF, and the SMF. The management device 10 may have functions of a network slice selection function (NSSF), an authentication server function (AUSF), a policy control function (PCF), and unified data management (UDM). Furthermore, the management device 10 may have a function of a home subscriber server (HSS).

Note that the management device 10 may have a function of a gateway. For example, the management device 10 may have functions of a serving gateway (S-GW) and a packet data network gateway (P-GW). Furthermore, the management device 10 may have a function of a user plane function (UPF).

The core network includes a plurality of network functions. The network functions may be aggregated in one physical device, or may be distributed to a plurality of physical devices. That is, the management device 10 can be distributed and arranged in a plurality of devices. Moreover, the distribution and arrangement may be controlled so as to be dynamically executed. The base station 20 and the management device 10 constitute one network, and provide radio communication service to the terminal device 40. The management device 10 is connected to the Internet. The terminal device 40 can use various pieces of service provided over the Internet via the base station 20.

Note that the management device 10 is not necessarily required to constitute the core network. For example, the core network is assumed to be a core network of wideband code division multiple access (W-CDMA) or code division multiple access 2000 (cdma2000). In this case, the management device 10 may function as a radio network controller (RNC).

Figure 4:
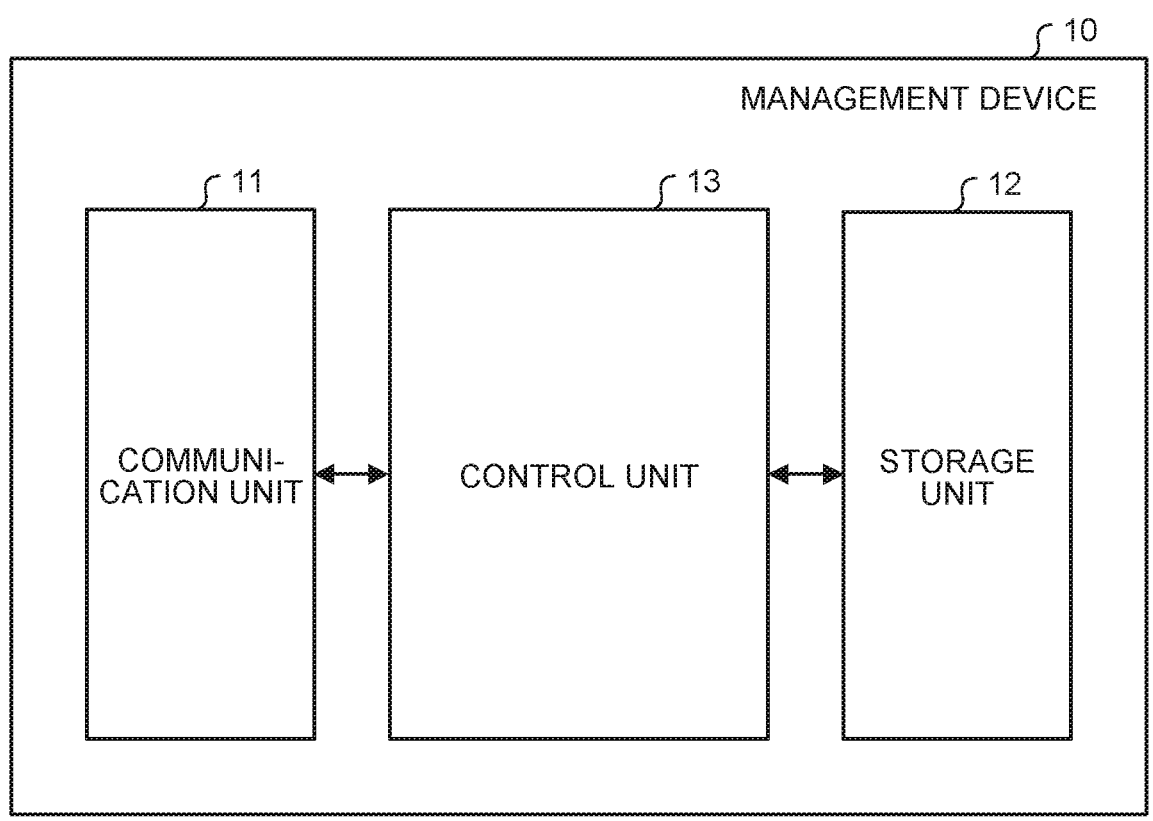
FIG. 4 illustrates a configuration example of a management device according to the embodiment of the present disclosure.

FIG. 4 illustrates a configuration example of the management device 10 according to the embodiment of the present disclosure. The management device 10 includes a communication unit 11, a storage unit 12, and a control unit 13. Note that FIG. 4 illustrates a functional configuration, and the hardware configuration may be different from the configuration. Furthermore, the functions of the management device 10 may be statically or dynamically distributed and implemented in a plurality of physically separated configurations. For example, the management device 10 may include a plurality of server devices.

The communication unit 11 is a communication interface for communicating with another device. The communication unit 11 may be a network interface or an equipment connection interface. For example, the communication unit 11 may be a local area network (LAN) interface such as a network interface card (NIC), or may be a USB interface including a universal serial bus (USB) host controller, a USB port, and the like. Furthermore, the communication unit 11 may be a wired interface or a radio interface. The communication unit 11 functions as a communication instrument of the management device 10. The communication unit 11 communicates with the base station 20 under the control of the control unit 13.

The storage unit 12 is a data readable/writable storage device such as a dynamic random access memory (DRAM), a static random access memory (SRAM), a flash memory, and a hard disk. The storage unit 12 functions as a storage instrument of the management device 10. The storage unit 12 stores, for example, a connection state of the terminal device 40. For example, the storage unit 12 stores a state of radio resource control (RRC) of the terminal devices 40 and states of EPS connection management (ECM) and 5G system connection management (CM). The storage unit 12 may function as a home memory that stores information on a position of the terminal devices 40.

The control unit 13 is a controller that controls each unit of the management device 10. The control unit 13 is implemented by a processor such as a central processing unit (CPU), a micro processing unit (MPU), and a graphics processing unit (GPU). For example, the control unit 13 is implemented by a processor executing various programs stored in a storage device in the management device 10 by using a random access memory (RAM) or the like as a work area. Note that the control unit 13 may be implemented by an integrated circuit such as an application specific integrated circuit (ASIC) and a field programmable gate array (FPGA). Any of the CPU, the MPU, the GPU, the ASIC, and the FPGA can be regarded as a controller.

2-3. Configuration of Base Station

Next, the configuration of the base station 20 will be described.

The base station 20 is a radio communication device that wirelessly communicates with the terminal device 40. The base station 20 may wirelessly communicate with the terminal devices 40 via the relay station 30, or may wirelessly communicate with the terminal devices 40 directly.

The base station 20 is a type of communication device. More specifically, the base station 20 is a device corresponding to a radio base station (e.g., base station, Node B, eNB, and gNB) or a radio access point. The base station 20 may be a radio relay station. Furthermore, the base station 20 may be an optical extension device called a remote radio head (RRH) or a radio unit (RU). Furthermore, the base station 20 may be a reception station such as a field pickup unit (FPU). Furthermore, the base station 20 may be an integrated access and backhaul (IAB) donor node or an IAB relay node, which provide a radio access line and a radio backhaul line by time division multiplexing, frequency division multiplexing, or spatial division multiplexing.

Note that the base station 20 may use cellular communication technology or radio LAN technology as the radio access technology. Of course, the radio access technology used by the base station 20 is not limited thereto. The base station 20 may use other radio access technology. For example, the base station 20 may use low power wide area (LPWA) communication technology as the radio access technology. Of course, the base station 20 may perform radio communication using millimeter waves as the radio communication. Furthermore, the base station 20 may perform radio communication using radio waves or radio communication (optical radio communication) using infrared rays and visible light as the radio communication.

The base station 20 may be capable of performing non-orthogonal multiple access (NOMA) communication with the terminal device 40. Here, the NOMA communication refers to communication (transmission, reception, or both thereof) using non-orthogonal resources. Note that the base station 20 may be capable of performing the NOMA communication with another base station 20.

Note that base stations 20 may be capable of communicating with each other via an interface between a base station and a core network (e.g., NG interface and S1 interface). Any of a wired interface and a radio interface may be used as the interface. Furthermore, the base stations may be capable of communicating with each other via an interface between base stations (e.g., Xn interface, X2 interface, S1 interface, and F1 interface). Any of a wired interface and a radio interface may be used as the interface.

Note that the concept of the base station includes not only a donor base station but a relay base station (also referred to as relay station). For example, the relay base station may be any one of an RF repeater, a smart repeater, and an intelligent surface. Furthermore, the concept of the base station includes not only a structure having a function of the base station but a device installed in the structure.

The structure includes a building such as a high-rise building, a house, a steel tower, station facilities, airport facilities, harbor facilities, an office building, a school building, a hospital, a factory, commercial facilities, and a stadium. Note that the concept of the structure includes not only a building but a non-building structure such as a tunnel, a bridge, a dam, a wall, and an iron pillar, and facilities such as a crane, a gate, and a windmill. Furthermore, the concept of the structure includes not only a structure on land (on ground in narrow sense) or in the ground but a structure on water such as a pier and a megafloat, and a structure under water such as marine observation facilities. The base station can be rephrased as an information processing device.

The base station 20 may be a donor station or a relay station. Furthermore, the base station 20 may be a fixed station or a mobile station. The mobile station is a movable radio communication device (e.g., base station). In this case, the base station 20 may be a device installed in a moving object, or may be the moving object itself. For example, a relay station having mobility can be regarded as the base station 20 serving as a mobile station. Furthermore, a device originally having the mobility and mounted with a function (at least part of function of base station) of a base station, such as a vehicle, an unmanned aerial vehicle (UAV) represented by a drone, and a smartphone, also corresponds to the base station 20 serving as the mobile station.

Here, the moving object may be a mobile terminal such as a smartphone and a mobile phone. Furthermore, the moving object may be a moving object that moves on land (on ground in narrow sense) (e.g., vehicle such as automobile, bicycle, bus, truck, motorcycle, train, and linear motor car) or a moving object that moves in the ground (e.g., in tunnel) (e.g., subway).

Furthermore, the moving object may be a moving object that moves on water (e.g., vessel such as passenger ship, cargo ship, and hovercraft) or a moving object that moves under water (e.g., submersible ship such as submersible, submarine, and unmanned submersible machine).

Note that the moving object may be a moving object that moves in the atmosphere (e.g., aircraft such as airplane, airship, and drone).

Furthermore, the base station 20 may be a ground base station (ground station) installed on the ground. For example, the base station 20 may be disposed in a structure on the ground, or may be installed in a moving object that moves on the ground. More specifically, the base station 20 may be an antenna installed in a structure such as a building and a signal processing device connected to the antenna. Of course, the base station 20 may be a structure or a moving object itself. "On the ground" has a broad sense including not only on the land (on ground in narrow sense) but in the ground, on water, and under water. Note that the base station 20 is not limited to a ground base station. For example, when the communication system 1 is a satellite communication system, the base station 20 may be an aircraft station. As seen from a satellite station, an aircraft station located on the earth is a ground station.

Note that the base station 20 is not limited to a ground station. The base station 20 may be a non-ground base station (non-ground station) capable of floating in the air or space. For example, the base station 20 may be an aircraft station or a satellite station.

The satellite station can float outside the atmosphere. The satellite station may be a device mounted in a space moving object such as an artificial satellite, or may be a space moving object itself. The space moving object moves outside the atmosphere. Examples of the space moving object include an artificial celestial object such as an artificial satellite, a spacecraft, a space station, and a probe.

Note that a satellite serving as a satellite station may be any of a low earth orbiting (LEO) satellite, a medium earth orbiting (MEO) satellite, a geostationary earth orbiting (GEO) satellite, and a highly elliptical orbiting (HEO) satellite. Of course, the satellite station may be a device mounted in a low earth orbiting satellite, a middle earth orbiting satellite, a geostationary earth orbiting satellite, or a highly elliptical orbiting satellite.

The aircraft station is a radio communication device capable of floating in the atmosphere, such as an aircraft. The aircraft station may be a device mounted in an aircraft and the like, or may be an aircraft itself. Note that the concept of the aircraft includes not only a heavy aircraft such as an airplane and a glider but a light aircraft such as a balloon and an airship. Furthermore, the concept of the aircraft includes not only the heavy aircraft and the light aircraft but a rotorcraft such as a helicopter and an autogyro. Note that the aircraft station (or aircraft mounted with aircraft station) may be an unmanned aircraft such as a drone.

Note that the concept of the unmanned aircraft also includes an unmanned aircraft system (UAS) and a tethered unmanned aircraft system (tethered UAS). Furthermore, the concept of the unmanned aircraft includes a lighter than air (LTA) UAS and a heavier than air (HTA) UAS. In addition, the concept of the unmanned aircraft also includes a high altitude UAS platform (HAP).

The coverage of the base station 20 may be as large as a macro cell, or as small as a pico cell. Of course, the coverage of the base station 20 may be as extremely small as a femto cell. Furthermore, the base station 20 may have a beamforming capability. In this case, in the base station 20, a cell or a service area may be formed for each beam.

Figure 5:
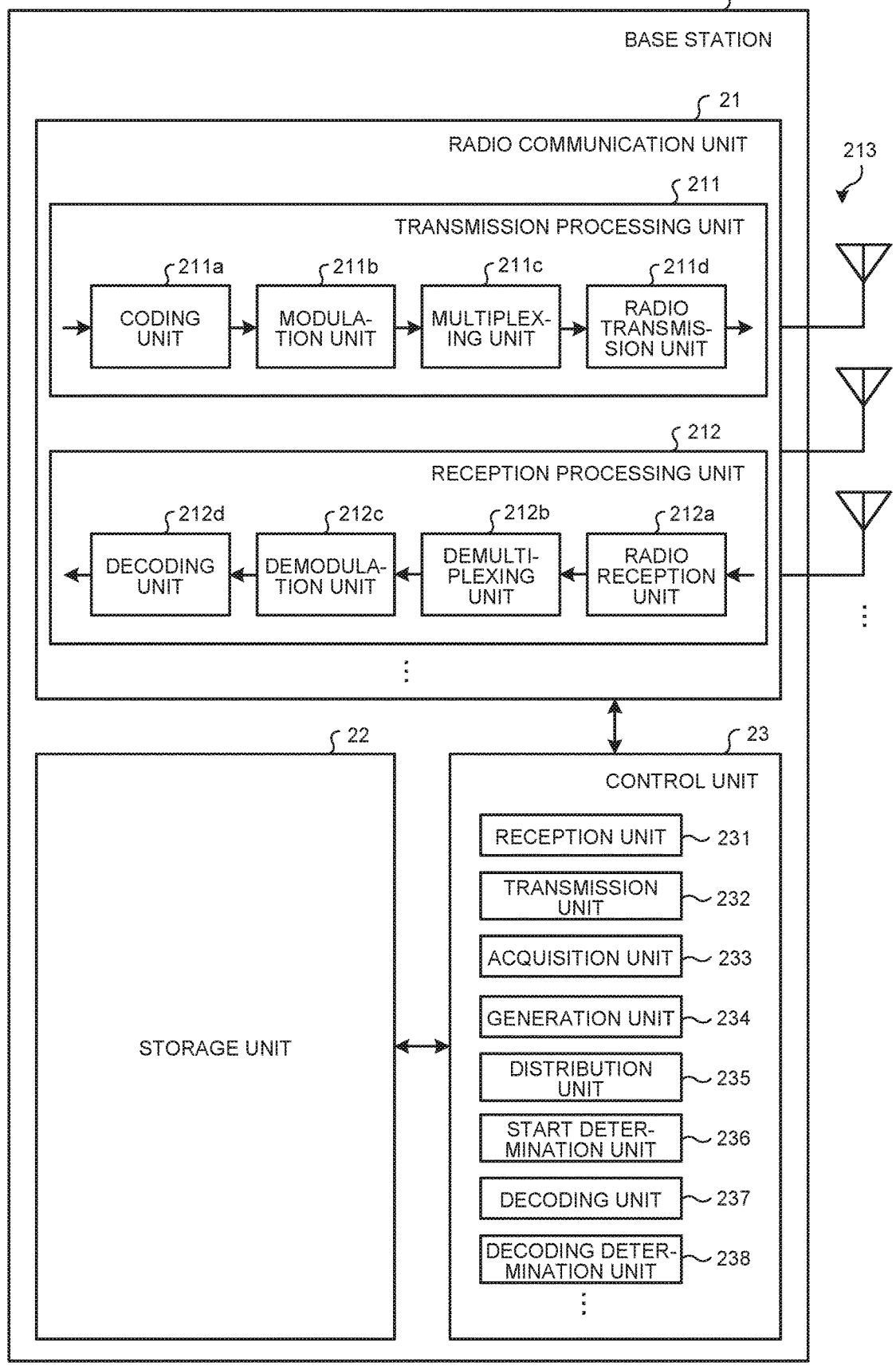
FIG. 5 illustrates a configuration example of a base station according to the embodiment of the present disclosure.

FIG. 5 illustrates a configuration example of the base station 20 according to the embodiment of the present disclosure. The base station 20 includes a radio communication unit 21, a storage unit 22, and a control unit 23. Note that FIG. 5 illustrates a functional configuration, and the hardware configuration may be different from the configuration. Furthermore, the functions of the base station 20 may be distributed and implemented in a plurality of physically separated configurations.

The radio communication unit 21 is a signal processing unit for wirelessly communicating with another radio communication device (e.g., terminal device 40). The radio communication unit 21 operates under the control of the control unit 23. The radio communication unit 21 supports one or a plurality of radio access methods. For example, the radio communication unit 21 supports both the NR and the LTE. The radio communication unit 21 may support W-CDMA or cdma2000 in addition to the NR or the LTE. Furthermore, the radio communication unit 21 may support automatic retransmission technology such as hybrid automatic repeat request (HARQ).

The radio communication unit 21 includes a transmission processing unit 211, a reception processing unit 212, and an antenna 213. The radio communication unit 21 may include a plurality of transmission processing units 211, a plurality of reception processing units 212, and a plurality of antennas 213. Note that, when the radio communication unit 21 supports a plurality of radio access methods, each unit of the radio communication unit 21 can be individually configured for each radio access method. For example, the transmission processing unit 211 and the reception processing unit 212 may be individually configured by the LTE and the NR. Furthermore, the antenna 213 may include a plurality of antenna elements (e.g., plurality of patch antennas). In this case, the radio communication unit 21 may be configured to be capable of performing beamforming. The radio communication unit 21 may be configured to be capable of performing polarization beamforming using vertically polarized waves (V-polarized waves) and horizontally polarized waves (H-polarized waves).

The transmission processing unit 211 performs processing of transmitting downlink control information and downlink data. For example, the transmission processing unit 211 codes downlink control information and downlink data input from the control unit 23 by using a coding method such as block coding, convolutional coding, turbo coding, and the like. Here, in such coding, coding with a polar code and coding with a low density parity check (LDPC) code may be performed. Then, the transmission processing unit 211 modulates a coded bit by a predetermined modulation method such as BPSK, QPSK, 16 QAM, 64 QAM, and 256 QAM. In this case, signal points on a constellation is not necessarily required to be equidistant from each other. The constellation may be a non uniform constellation (NUC). Then, the transmission processing unit 211 multiplexes a modulation symbol of each channel and a downlink reference signal, and places the multiplexed modulation symbol and the downlink reference signal to a predetermined resource element. Then, the transmission processing unit 211 performs various pieces of signal processing on the multiplexed signal. For example, the transmission processing unit 211 performs processing such as conversion into a frequency domain by fast Fourier transform, addition of a guard interval (cyclic prefix), generation of a baseband digital signal, conversion into an analog signal, quadrature modulation, up-conversion, removal of an extra frequency component, and power amplification. A signal generated by the transmission processing unit 211 is transmitted from the antenna 213.

The reception processing unit 212 processes an uplink signal received via the antenna 213. For example, the reception processing unit 212 performs, on the uplink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. Then, the reception processing unit 212 separates an uplink channel such as a physical uplink shared channel (PUSCH) and a physical uplink control channel (PUCCH) and an uplink reference signal from signals subjected to these pieces of processing. Furthermore, the reception processing unit 212 demodulates a reception signal by using a modulation method such as binary phase shift keying (BPSK) and quadrature phase shift keying (QPSK) for a modulation symbol of the uplink channel. The modulation method used in the demodulation may be 16 quadrature amplitude modulation (QAM), 64 QAM, or 256 QAM. In this case, signal points on a constellation is not necessarily required to be equidistant from each other. The constellation may be a non uniform constellation (NUC). Then, the reception processing unit 212 performs decoding processing on a demodulated coded bit of the uplink channel. Decoded uplink data and uplink control information are output to the control unit 23.

The antenna 213 is an antenna device (antenna unit) that mutually converts current and radio waves. The antenna 213 may include one antenna element (e.g., one patch antenna), or may include a plurality of antenna elements (e.g., plurality of patch antennas). When the antenna 213 includes a plurality of antenna elements, the radio communication unit 21 may be configured to be capable of performing beamforming. For example, the radio communication unit 21 may be configured to generate a directional beam by controlling the directivity of a radio signal using a plurality of antenna elements. Note that the antenna 213 may be a dual-polarized antenna. When the antenna 213 is a dual-polarized antenna, the radio communication unit 21 may use vertically polarized waves (V-polarized waves) and horizontally polarized waves (H-polarized waves) in transmitting a radio signal. Then, the radio communication unit 21 may control the directivity of the radio signal transmitted by using the vertically polarized waves and the horizontally polarized waves. Furthermore, the radio communication unit 21 may transmit and receive spatially multiplexed signals via a plurality of layers including a plurality of antenna elements.

The storage unit 22 is a data readable/writable storage device such as a DRAM, an SRAM, a flash memory, and a hard disk. The storage unit 22 functions as a storage instrument of the base station 20.

The control unit 23 is a controller that controls each unit of the base station 20. For example, the control unit 23 is implemented by a processor such as a central processing unit (CPU) and a micro processing unit (MPU). For example, the control unit 23 is implemented by a processor executing various programs stored in a storage device in the base station 20 by using a random access memory (RAM) or the like as a work area. Note that the control unit 23 may be implemented by an integrated circuit such as an application specific integrated circuit (ASIC) and a field programmable gate array (FPGA). Any of the CPU, the MPU, the ASIC, and the FPGA can be regarded as a controller. Furthermore, the control unit 23 may be achieved by a graphics processing unit (GPU) in addition to or instead of the CPU.

The control unit 23 includes a reception unit 231, a transmission unit 232, an acquisition unit 233, a generation unit 234, a distribution unit 235, a start determination unit 236, a decoding unit 237, and a decoding determination unit 238. Each block (reception unit 231 to decoding determination unit 238) constituting the control unit 23 is a functional block exhibiting functions of the control unit 23. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. The control unit 23 may include a functional unit different from the above-described functional blocks. Any method of constituting a functional block can be adopted. Note that the operation of the control unit 23 may be the same as the operation of each block of the control unit of the terminal device 40.

In some embodiments, the concept of the base station may include an assembly of a plurality of physical or logical devices. For example, in this embodiment, the base station may be distinguished into a plurality of devices such as a baseband unit (BBU) and a radio unit (RU). Then, the base station may be interpreted as an assembly of the plurality of devices. Furthermore, the base station may be either or both of the BBU and the RU. The BBU and the RU may be connected by a predetermined interface (e.g., enhanced common public radio interface (eCPRI)). Note that the RU may be rephrased as a remote radio unit (RRU) or a radio dot (RD). Furthermore, the RU may correspond to a gNB distributed unit (gNB-DU) to be described later. Moreover, the BBU may correspond to a gNB central unit (gNB-CU). Alternatively, the RU may be a radio device connected to the gNB-DU to be described later. The gNB-CU, the gNB-DU, and the RU connected to the gNB-DU may comply with an open radio access network (O-RAN). Moreover, the RU may be a device integrated with an antenna. An antenna (e.g., antenna integrated with RU) of the base station may adopt an advanced antenna system, and support MIMO (e.g., FD-MIMO) and beamforming. Furthermore, the antenna of the base station may include, for example, 64 transmission antenna ports and 64 reception antenna ports.

Furthermore, the antenna mounted on the RU may be an antenna panel including one or more antenna elements. The RU may be mounted with one or more antenna panels. For example, the RU may be mounted with two types of antenna panels including an antenna panel of horizontally polarized waves and an antenna panel of vertically polarized waves or two types of antenna panels including an antenna panel of a right-handed circularly polarized waves and an antenna panel of left-handed circularly polarized waves. Furthermore, the RU may form and control an independent beam for each antenna panel.

Note that a plurality of base stations may be connected to each other. One or a plurality of base stations may be included in a radio access network (RAN). In this case, the base station may be simply referred to as a RAN, a RAN node, an access network (AN), or an AN node. Note that a RAN in LTE may be called an enhanced universal terrestrial RAN (EUTRAN). Furthermore, a RAN in NR may be called as an NGRAN. Furthermore, a RAN in W-CDMA (UMTS) may be called a UTRAN.

Note that a base station of the LTE may be referred to as an evolved node B (eNodeB) or an eNB. In this case, the EUTRAN includes one or a plurality of eNodeBs (eNBs). Furthermore, a base station of the NR may be referred to as a gNodeB or a gNB. In this case, the NGRAN includes one or a plurality of gNBs. The EUTRAN may include a gNB (en-gNB) connected to a core network in an LTE communication system (EPS) (EPC). Similarly, the NGRAN may include an ng-eNB connected to a core network 5GC in a 5G communications system (5GS).

Note that, when the base station is an eNB, a gNB, or the like, the base station may be referred to as a 3GPP access. Furthermore, when the base station is a radio access point, the base station may be referred to as a non-3GPP access. Moreover, the base station may be an optical extension device called a remote radio head (RRH) or a radio unit (RU). Furthermore, when the base station is a gNB, the base station may be obtained by combining the gNB-CU and the gNB-DU described above, or may be either of the gNB-CU and the gNB-DU.

Here, for communication with UE, the gNB-CU hosts a plurality of upper layers (e.g., radio resource control (RRC), service data adaptation protocol (SDAP), and packet data convergence protocol (PDCP)) among access strata. In contrast, the gNB-DU hosts a plurality of lower layers (e.g., radio link control (RLC), medium access control (MAC), and physical layer (PHY)) among the access strata. That is, among messages/information to be described later, RRC signaling (semi-static notification) may be generated by the gNB-CU while MAC CE and DCI (dynamic notification) may be generated by the gNB-DU. Alternatively, among RRC configurations (semi-static notifications), for example, some configurations such as IE: cellGroupConfig may be generated by the gNB-DU, and the remaining configurations may be generated by the gNB-CU. These configurations may be transmitted and received through an F1 interface to be described later.

Note that the base station may be configured to be capable of communicating with another base station. For example, when a plurality of base stations is obtained by combining eNBs or an eNB and an en-gNB, the base stations may be connected with each other by an X2 interface. Furthermore, when the plurality of base stations is obtained by combining gNBs or a gn-eNB and a gNB, the devices may be connected with each other by an Xn interface. Furthermore, when the plurality of base stations is obtained by combining a gNB-CU and a gNB-DU, the devices may be connected with each other by the above-described F1 interface. A message/ information (e.g., RRC signaling, MAC control element (MAC CE), and DCI) to be described later may be transmitted between a plurality of base stations via, for example, the X2 interface, the Xn interface, or the F1 interface.

A cell provided by the base station may be called a serving cell. The concept of the serving cell includes a primary cell (PCell) and a secondary cell (SCell). When dual connectivity is set for UE (e.g., terminal device 40), the PCell provided by a master node (MN) and zero or one or more SCells may be called a master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Note that the serving cell may include a primary secondary cell or a primary SCG cell (PSCell). When the dual connectivity is set for UE, a PSCell provided by a secondary node (SN) and zero or one or more SCells may be called a secondary cell group (SCG). Unless a special setting (e.g., PUCCH on SCell) is made, a physical uplink control channel (PUCCH) is transmitted in the PCell and the PSCell, but is not transmitted in the SCell. Furthermore, a radio link failure is also detected in the PCell and the PSCell, but is not detected in the SCell (is not required to be detected). As described above, the PCell and the PSCell have a special role in the serving cell, and thus are also called special cells (SpCells).

One downlink component carrier and one uplink component carrier may be associated with one cell. Furthermore, a system bandwidth for one cell may be divided into a plurality of bandwidth parts (BWPs). In this case, one or a plurality of BWPs may be set to UE, and the UE may use one BWP as an active BWP. Furthermore, radio resources (e.g., frequency band, numerology (subcarrier spacing), and slot format (slot configuration)) that can be used by the terminal device 40 may be different for each cell, each component carrier, or each BWP.

2-4. Configuration of Relay Station

Next, the configuration of the relay station 30 will be described.

The relay station 30 is a device serving as a relay station of a base station. The relay station 30 is a type of base station. Furthermore, the relay station 30 is a type of information processing device. The relay station may be rephrased as a relay base station. Furthermore, the relay station 30 may be a device called a repeater (e. g., RF repeater, smart repeater, and intelligent surface).

The relay station 30 can perform radio communication such as the NOMA communication with the terminal device 40. The relay station 30 relays communication between the base station 20 and the terminal device 40. Note that the relay station 30 may be capable of wirelessly communicating with another relay station 30 and another base station 20. The relay station 30 may be a ground station device or a non-ground station device. The relay station 30 constitutes a radio access network RAN together with the base station 20.

Note that the relay station of the embodiment may be a fixed device, a movable device, or a floatable device. Furthermore, the size of the coverage of the relay station of the embodiment is not limited to a specific size. For example, the cell covered by the relay station may be a macro cell, a micro cell, or a small cell.

Furthermore, the relay station of the embodiment is not limited to a mounted device as long as a relay function is satisfied. For example, the relay machine may be mounted in a terminal device such as a smartphone, may be mounted in an automobile, a train, or a human-powered vehicle, may be mounted in a balloon, an airplane, or a drone, may be mounted in a traffic light, a sign, and a street light, or may be mounted in a home appliance such as a television, a game machine, an air conditioner, a refrigerator, and a lighting fixture.

In addition, the relay station 30 may have a configuration similar to the above-described configuration of the base station 20. For example, similarly to the above-described base station 20, the relay station 30 may be a device installed in a moving object, or may be a moving object itself. As described above, the moving object may be a mobile terminal such as a smartphone and a mobile phone. Furthermore, the moving object may move on land (on ground in narrow sense), or may move in the ground. Of course, the moving object may move on water, or may move under water. In addition, the moving object may move in the atmosphere, or may move outside the atmosphere. Furthermore, the relay station 30 may be a ground station device or a non-ground station device. In this case, the relay station 30 may be an aircraft station or a satellite station.

Furthermore, similarly to the case of the base station 20, the relay station 30 may have a coverage as large as that of a macro cell or as small as that of a pico cell. Of course, the relay station 30 may have a coverage as extremely small as that of a femto cell. Furthermore, the relay station 30 may have beamforming capability. In this case, in the relay station 30, a cell or a service area may be formed for each beam.

Figure 6:
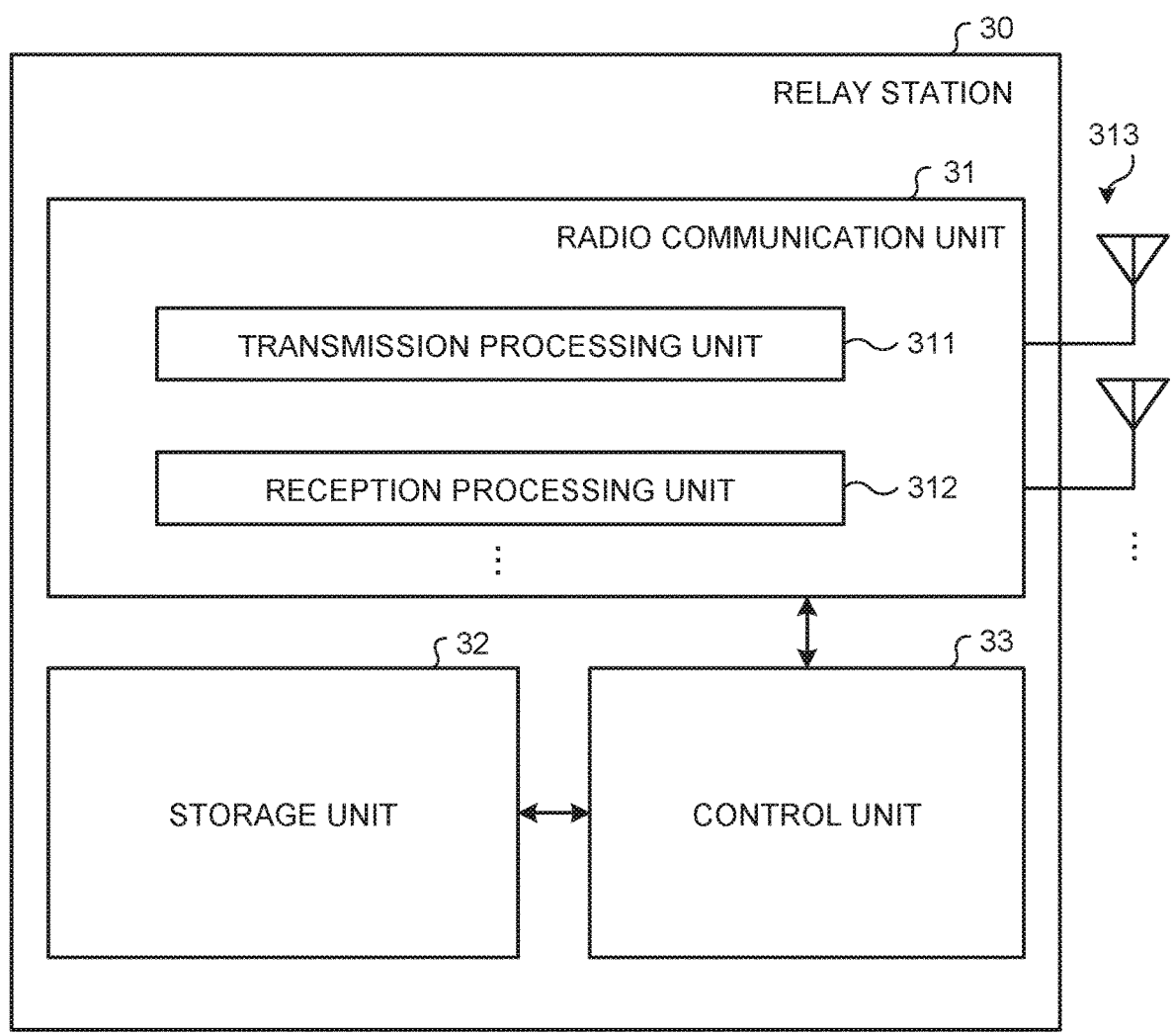
FIG. 6 illustrates a configuration example of a relay station according to the embodiment of the present disclosure.

FIG. 6 illustrates a configuration example of the relay station 30 according to the embodiment of the present disclosure. The relay station 30 includes a radio communication unit 31, a storage unit 32, and a control unit 33. Note that FIG. 6 illustrates a functional configuration, and the hardware configuration may be different from the configuration. Furthermore, the functions of the relay station 30 may be distributed and implemented in a plurality of physically separated configurations.

The radio communication unit 31 is a radio communication interface that wirelessly communicates with another radio communication device (e.g., base station 20, terminal device 40, and another relay station 30). The radio communication unit 31 supports one or a plurality of radio access methods. For example, the radio communication unit 31 supports both NR and LTE. The radio communication unit 31 may support W-CDMA or cdma2000 in addition to the NR or the LTE. The radio communication unit 31 includes a transmission processing unit 311, a reception processing unit 312, and an antenna 313. The radio communication unit 31 may include a plurality of transmission processing units 311, a plurality of reception processing units 312, and a plurality of antennas 313. Note that, when the radio communication unit 31 supports a plurality of radio access methods, each unit of the radio communication unit 31 can be individually configured for each radio access method. For example, the transmission processing unit 311 and the reception processing unit 312 may be individually configured by the LTE and the NR. The transmission processing unit 311, the reception processing unit 312, and the antenna 313 have configurations similar to those of the transmission processing unit 211, the reception processing unit 212, and the antenna 213 as described above. Note that the radio communication unit 31 may be configured to be capable of performing beamforming similarly to the radio communication unit 21.

The storage unit 32 is a data readable/writable storage device such as a DRAM, an SRAM, a flash memory, and a hard disk. The storage unit 32 functions as a storage instrument of the relay station 30.

The control unit 33 is a controller that controls each unit of the relay station 30. The control unit 33 is implemented by a processor such as a CPU, an MPU, and a GPU. For example, the control unit 33 is implemented by a processor executing various programs stored in a storage device in the relay station 30 by using a RAM and the like as a work area. Note that the control unit 33 may be implemented by an integrated circuit such as an ASIC and an FPGA. Any of the CPU, the MPU, the GPU, the ASIC, and the FPGA can be regarded as a controller. The operation of the control unit 33 may be the same as the operation of each block (reception unit 231 to decoding determination unit 238) of the control unit 23 of the base station 20.

Note that the relay station 30 may be an IAB relay node. The relay station 30 operates as an IAB mobile termination (IAB-MT) for an IAB donor node that provides a backhaul, and operates an IAB distributed unit (IAB-DU) for the terminal device 40 that provides access. The IAB donor node may be, for example, the base station 20, and operates as an IAB central unit (IAB-CU).

2-5. Configuration of Terminal Device

Next, the configuration of the terminal device 40 will be described.

The terminal device 40 is a radio communication device that wirelessly communicates with other communication devices such as the base station 20 and the relay station 30. The terminal device 40 is, for example, a mobile phone, a smart device (smartphone or tablet), a personal digital assistant (PDA), and a personal computer. Furthermore, the terminal device 40 may be equipment such as a business camera provided with a communication function, or may be a motorcycle, a moving relay vehicle, or the like mounted with communication equipment such as a field pickup unit (FPU). Furthermore, the terminal device 40 may be a machine to machine (M2M) device or an Internet of Things (IoT) device.

Note that the terminal device 40 may be capable of performing the NOMA communication with the base station 20. Furthermore, the terminal device 40 may be capable of using automatic retransmission technology such as HARQ at the time of communicating with the base station 20. The terminal device 40 may be capable of performing sidelink communication with another terminal device 40. The terminal device 40 may be capable of using the automatic retransmission technology such as HARQ at the time when performing the sidelink communication. Note that the terminal device 40 may also be capable of performing the NOMA communication in communication (sidelink) with another terminal device 40. Furthermore, the terminal device 40 may be capable of performing LPWA communication with another communication device (e.g., base station 20 and another terminal device 40). Furthermore, the radio communication used by the terminal device 40 may be performed by using millimeter waves. Note that the radio communication (including sidelink communication) used by the terminal device 40 may be performed by using radio waves, or may be performed by infrared rays or visible light (optical radio communication).

Furthermore, the terminal device 40 may be a moving object device. The moving object device is a movable radio communication device. In this case, the terminal device 40 may be a radio communication device installed in a moving object, or may be a moving object itself. For example, the terminal device 40 may be a vehicle that moves on a road, such as an automobile, a bus, a truck, and a motorcycle, a vehicle that moves on a rail installed in a track of a train and the like, or a radio communication device mounted on the vehicle. Note that the moving object may be a mobile terminal, or may be a moving object that moves on land (on ground in narrow sense), in the ground, on water, or under water. Furthermore, the moving object may be a moving object that moves in the atmosphere, such as a drone and a helicopter, or may be a moving object that moves outside the atmosphere, such as an artificial satellite.

The terminal device 40 may be simultaneously connected to a plurality of base stations or a plurality of cells to perform communication. For example, when one base station supports a communication area via a plurality of cells (e.g., pCell and sCell), the plurality of cells is bundled by carrier aggregation (CA) technology, dual connectivity (DC) technology, or multi-connectivity (MC) technology to enable communication between the base stations 20 and the terminal device 40. Alternatively, the terminal device 40 can communicate with the plurality of base stations 20 by coordinated multi-point transmission and reception (COMP) technology via cells of different base stations 20.

Figure 7:
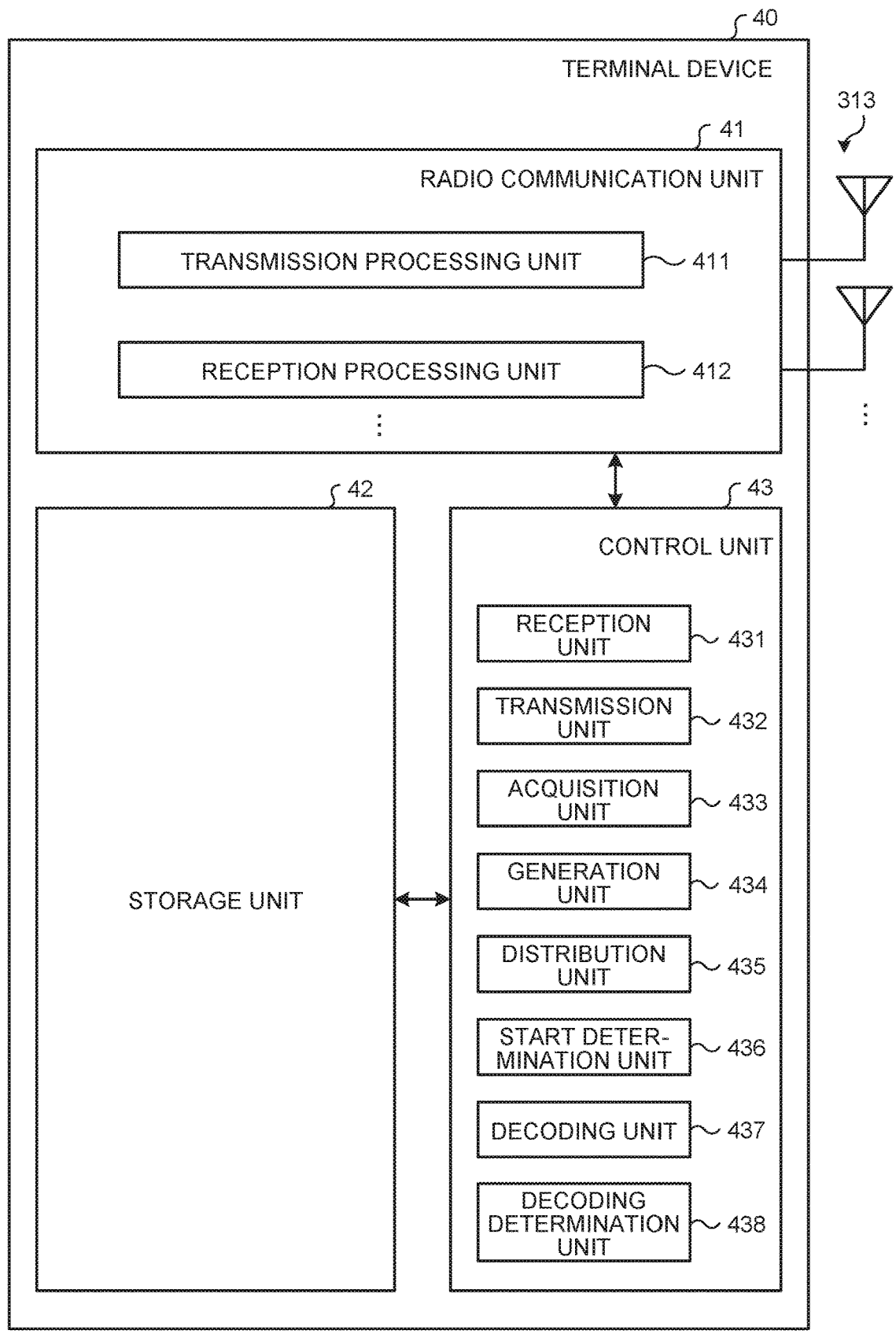
FIG. 7 illustrates a configuration example of a terminal device according to the embodiment of the present disclosure.

FIG. 7 illustrates a configuration example of the terminal device 40 according to the embodiment of the present disclosure. The terminal device 40 includes a radio communication unit 41, a storage unit 42, and a control unit 43. Note that FIG. 7 illustrates a functional configuration, and the hardware configuration may be different from the configuration. Furthermore, the functions of the terminal device 40 may be distributed and implemented in a plurality of physically separated configurations.

The radio communication unit 41 is a signal processing unit for wirelessly communicating with another radio communication device (e.g., base station 20, relay station 30, and another terminal device 40). The radio communication unit 41 operates under the control of the control unit 43. The radio communication unit 41 includes a transmission processing unit 411, a reception processing unit 412, and an antenna 413. The radio communication unit 41, the transmission processing unit 411, the reception processing unit 412, and the antenna 413 may have configurations similar to those of the radio communication unit 21, the transmission processing unit 211, the reception processing unit 212, and the antenna 213 of the base station 20. Furthermore, the radio communication unit 41 may be configured to be capable of performing beamforming similarly to the radio communication unit 21. Moreover, the radio communication unit 41 may be configured to be capable of transmitting and receiving spatially multiplexed signals similarly to the radio communication unit 21.

The storage unit 42 is a data readable/writable storage device such as a DRAM, an SRAM, a flash memory, and a hard disk. The storage unit 42 functions as a storage instrument of the terminal device 40.

The control unit 43 is a controller that controls each unit of the terminal device 40. The control unit 43 is implemented by a processor such as a CPU and an MPU. For example, the control unit 43 is implemented by a processor executing various programs stored in a storage device in the terminal device 40 by using a RAM and the like as a work area. Note that the control unit 43 may be implemented by an integrated circuit such as an ASIC and an FPGA. Any of the CPU, the MPU, the ASIC, and the FPGA can be regarded as a controller. Furthermore, the control unit 43 may be achieved by a GPU in addition to or instead of the CPU.

The control unit 43 includes a reception unit 431, a transmission unit 432, an acquisition unit 433, a generation unit 434, a distribution unit 435, a start determination unit 436, a decoding unit 437, and a decoding determination unit 438. Each block (reception unit 431 to decoding determination unit 438) constituting the control unit 43 is a functional block exhibiting functions of the control unit 43. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. The control unit 43 may include a functional unit different from the above-described functional blocks. Any method of constituting a functional block can be adopted. The operation of the control unit 43 may be the same as the operation of each block of the control unit 23 of the base station 20.

3. Operation of Communication System

Although the configuration of the communication system 1 of the embodiment has been described above, next, signal processing of the embodiment will be described.

3-1. Outline of Operation of Communication System

First, an operation of the communication system 1 will be outlined.

3-1-1. Outline of Signal Processing

Figure 8:
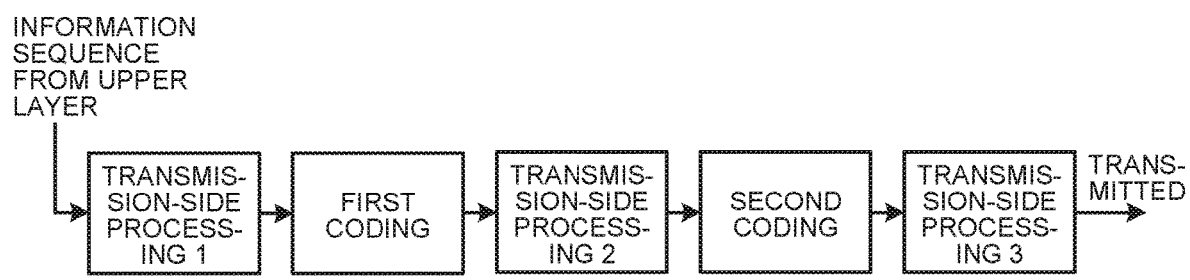
FIG. 8 outlines signal processing of a communication device on a transmission side.
Figure 9:
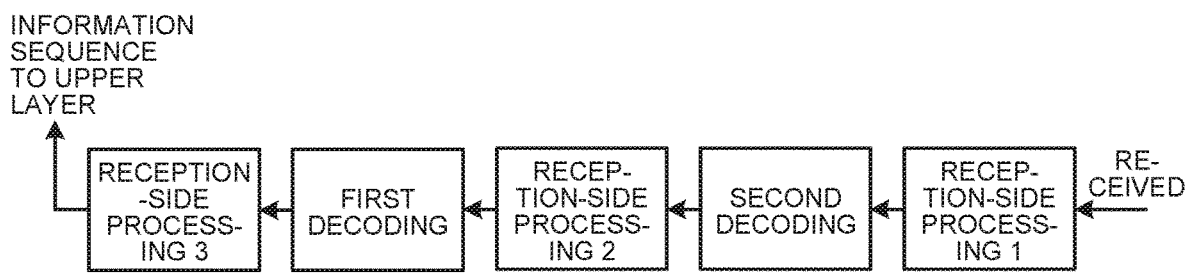
FIG. 9 outlines signal processing of a communication device on a reception side.

FIGS. 8 and 9 outline signal processing of the embodiment. FIG. 8 outlines signal processing of a communication device on a transmission side. FIG. 9 outlines signal processing of a communication device on a reception side. Any of the base station 20, the relay station 30, and the terminal device 40 can be a communication device on the transmission side or the reception side. In the embodiment, a communication device applies a plurality of pieces of processing related to forward error correction (FEC) to an information sequence to be transmitted and received.

In the example of FIG. 8, error correction processing is performed in each of first coding and second coding. First, when acquiring an information sequence from an upper layer (e.g., SDAP layer and RRC layer), a predetermined layer related to signal processing inside the communication device performs predetermined signal processing (transmission-side processing 1 in FIG. 8), and transmits the information sequence (hereinafter, also referred to as transmission data sequence) to a first coding layer (e.g., PDCP layer). The first coding layer executes first coding processing on the received transmission data sequence. The first coding processing includes first error correction coding processing. The coded transmission data sequence undergoes predetermined signal processing (transmission-side processing 2 in FIG. 8), and then is transmitted to the second coding layer (e.g., physical layer). The second coding layer executes second coding processing on the transmission data sequence. The second coding processing includes second error correction coding processing. The coded transmission data sequence undergoes predetermined signal processing (transmission-side processing 3 in FIG. 8), and then is transmitted to the communication device on the reception side.

Furthermore, in the example of FIG. 9, error correction processing is performed in each of first decoding and second decoding. First, when acquiring an information sequence (hereinafter, also referred to as reception data sequence) from the communication device on the transmission side, a predetermined layer related to signal processing inside the communication device performs predetermined signal processing (reception-side processing 1 in FIG. 9), and transmits the reception data sequence to a second decoding layer (e.g., physical layer). The second decoding layer executes second decoding processing corresponding to the second coding processing on the reception data sequence. The decoded reception data sequence undergoes predetermined signal processing (reception-side processing 2 in FIG. 9), and then is transmitted to a first decoding layer (e.g., PDCP layer). The first decoding layer executes first decoding processing corresponding to the first coding processing on the reception data sequence. The information sequence generated by the first decoding processing undergoes predetermined signal processing (reception-side processing 3 in FIG. 8), and is transmitted to an upper layer.

The communication device of the embodiment generates a plurality of bit sequences having different contents by applying the first coding processing based on a first error correction coding method to the transmission data sequence, and distributes and transmits the plurality of bit sequences to a plurality of channels. This causes the communication device to achieve high frequency utilization efficiency while maintaining communication reliability.

3-1-2. Coding Processing

The first coding processing and the second coding processing will be described below. Note that the first decoding processing and the second decoding processing correspond to the first coding processing and the second coding processing, respectively, and thus description thereof will be omitted.

(A) First Coding Processing

Figure 10:
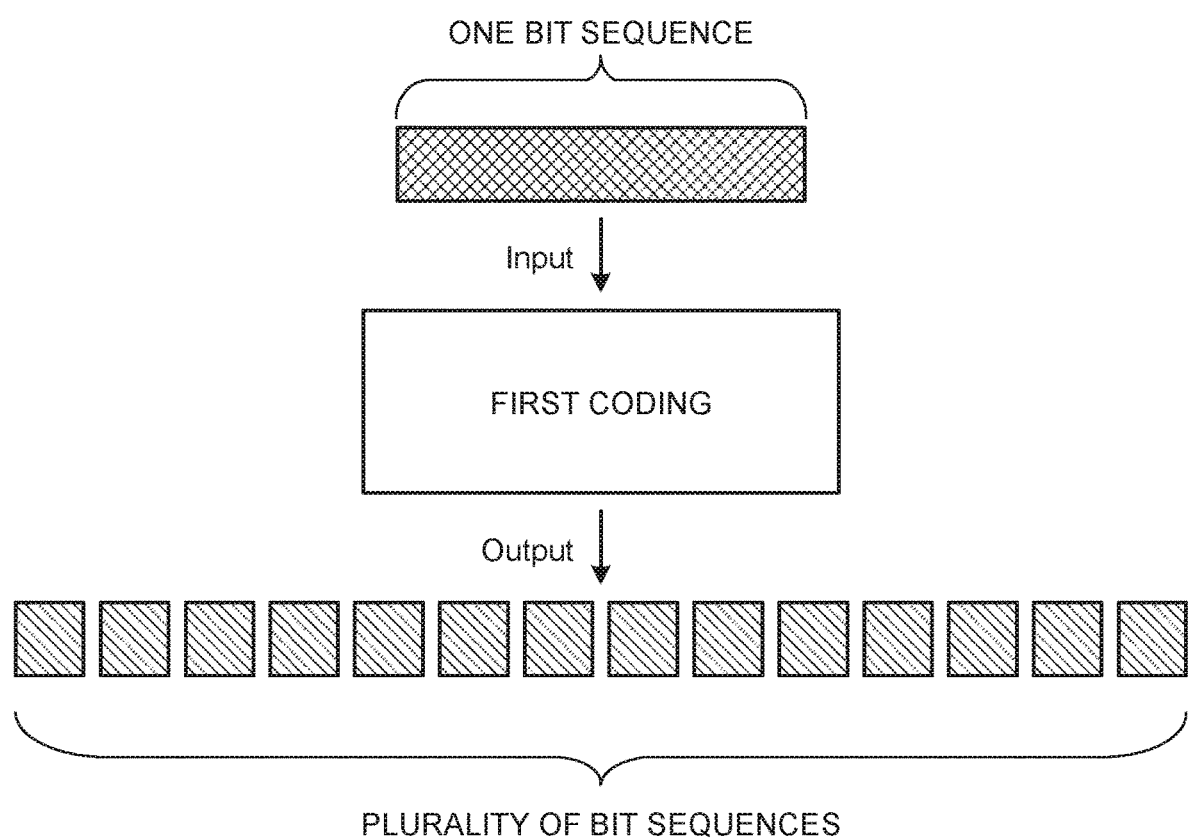
FIG. 10 illustrates first coding processing.

FIG. 10 illustrates the first coding processing. In the first coding processing, a plurality of bit sequences is generated from one bit sequence. Here, one bit sequence to be input in the first coding processing corresponds to the above-described transmission data sequence. Note that, in the first coding processing, the communication device may divide a plurality of output bit sequences into one or a plurality of first bit sequences required to be transmitted and one or a plurality of second bit sequences that can be decoded without being transmitted. Then, the communication device may set the one or the plurality of first bit sequences and one or a plurality of third bit sequences, which has been selected from the one or the plurality of second bit sequences, as a plurality of bit sequences to be output.

Figure 11:
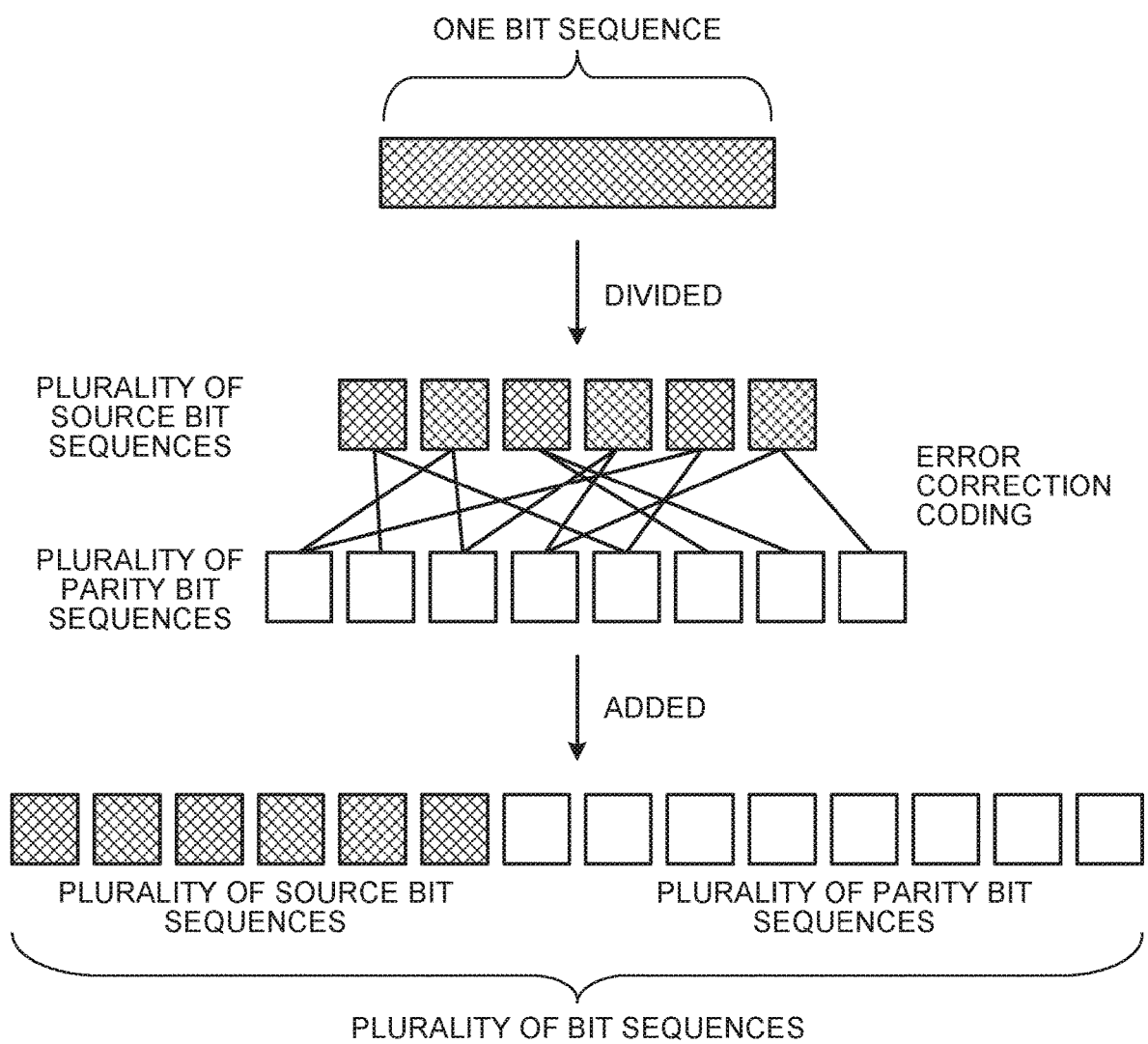
FIG. 11 illustrates one example of the first coding processing.

In the first coding processing, processing is performed by a predetermined error correction coding method. FIG. 11 illustrates one example of the first coding processing. First, the communication device divides one bit sequence (one source bit sequence) into a plurality of source bit sequences. Then, the communication device generates a plurality of parity bit sequences by performing error correction coding processing on the plurality of source bit sequences. For example, the communication device generates a plurality of parity bit sequences by sequentially executing error correction coding processing on a plurality of bit sequences each obtained by combining two source bit sequences. Then, the communication device generates a plurality of bit sequences to be output by adding the plurality of parity bit sequences to the plurality of source bit sequences. Note that not all the generated parity bit sequences are required to be added to the plurality of source bit sequences. The communication device may add one or a plurality of parity bit sequences selected from the plurality of parity bit sequences to the plurality of source bit sequences.

Note that the example in FIG. 11 is merely one example, and the first coding processing is not limited to the example in FIG. 11. For example, in the error correction coding method, when a predetermined bit sequence is input, not only a parity bit sequence but a coded bit sequence may be output.

An error correction coding method used in the first coding processing (hereinafter, also referred to as first error correction coding method) is desirably included in a category of erasure codes, rateless codes, fountain codes, and the like. Alternatively, in the error correction coding method used in the first coding processing, coding is desirably performed by performing linear synthesis or XOR synthesis on a plurality of bit sequences. Examples of the error correction coding method assumed to be used in the first coding processing will be described below in (A1) to (A11) below. Of course, the error correction coding method used in the first coding processing is not limited to the following examples.

Figure 12:
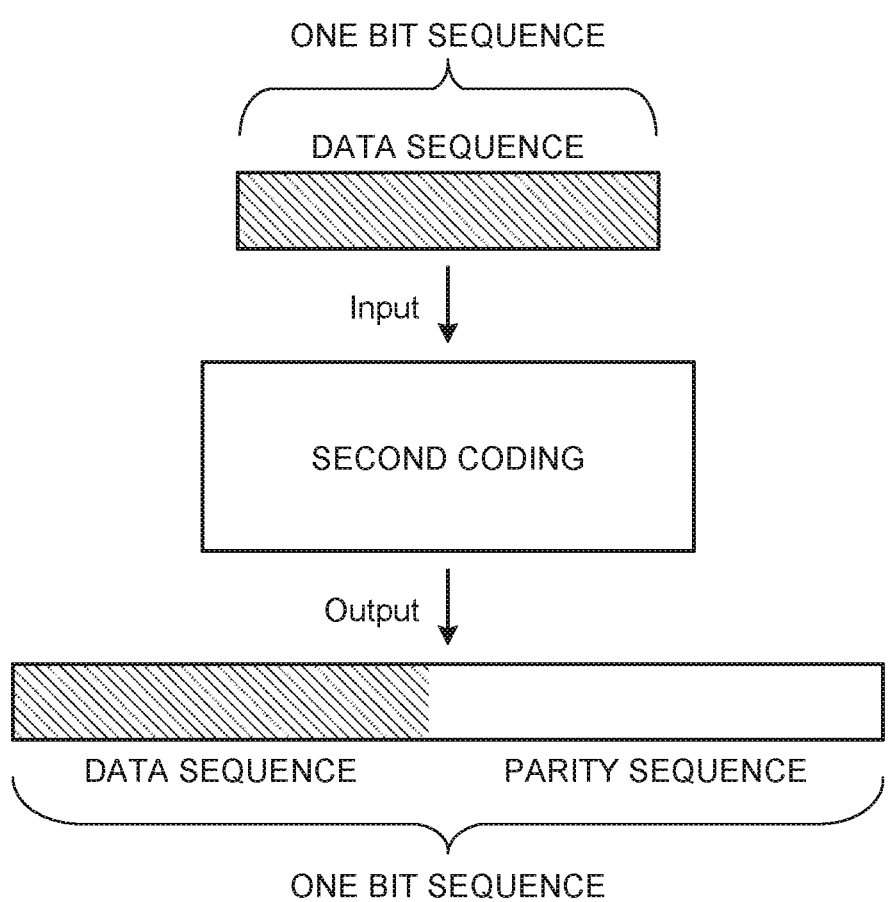
FIG. 12 illustrates second coding processing.

(A1) Erasure Codes
(A2) Rateless Codes
(A3) Fountain Codes
(A4) Tornado Codes
(A5) Luby Transform (LT) Codes
(A6) Raptor Codes
(A7) RaptorQ Codes
(A8) Low Density Parity Check (LDPC) Codes
(A9) BCH Codes
(A10) Reed Solomon (RS) Codes
(A11) Exclusive OR (XOR) Codes (B) Second Coding Processing FIG. 12 illustrates the second coding processing. In the second coding processing, one bit sequence is generated from one bit sequence (data sequence). Specifically, the communication device generates one bit sequence to be output by adding a parity sequence to one input bit sequence (data sequence). Note that the example in FIG. 12 is merely one example, and the second coding processing is not limited to the example in FIG. 12.

An error correction coding method used in the second coding processing (hereinafter, also referred to as second error correction coding method) is desirably included in a category of convolutional codes, turbo codes, LDPC codes, polar codes, and the like. Examples of the error correction coding method assumed to be used in the second coding processing will be described below in (B1) to (B4) below. Of course, the error correction coding method used in the second coding processing is not limited to the following examples.

(B1) Convolutional Codes
(B2) Turbo Codes
(B3) LDPC Codes
(B4) Polar Codes

3-1-3. Procedure Example Related to Coding

Figure 13:
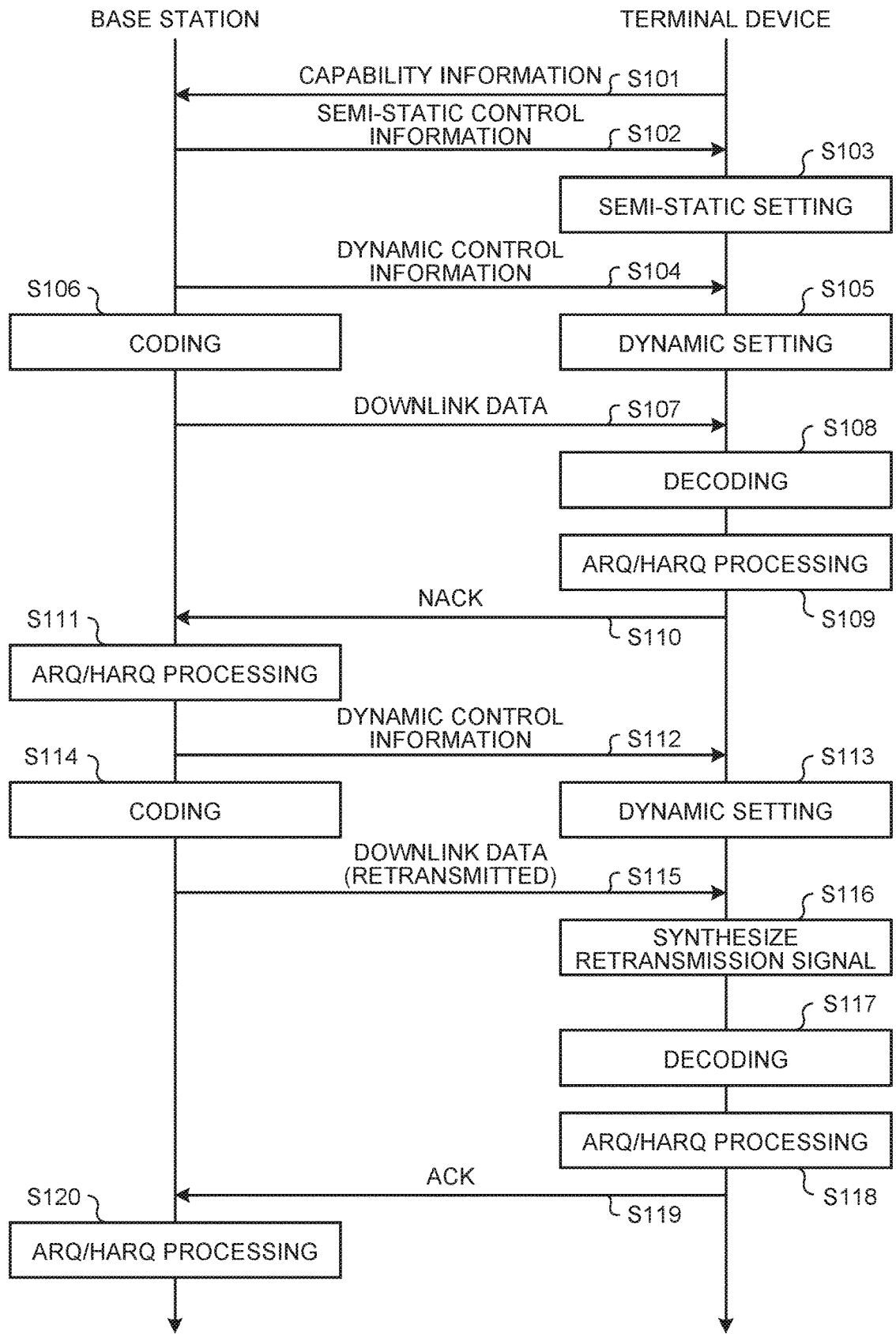
FIG. 13 is a sequence diagram illustrating a procedure example related to coding.

Next, a procedure example related to coding of the embodiment will be described. FIG. 13 is a sequence diagram illustrating the procedure example related to the coding. Note that the procedure example in FIG. 13 is merely one example, and the embodiment is not limited to the procedure example. Furthermore, although FIG. 13 illustrates downlink communication from the base station 20 to the terminal device 40, the technology disclosed in the embodiment can also be applied to other communication (e.g., uplink communication from terminal device 40 to base station 20). The procedure example related to the coding of the embodiment will be described below with reference to the sequence diagram of FIG. 13.

First, the terminal device 40 notifies the base station 20 of a cell to which the terminal device 40 itself is connected of information on terminal capability of the terminal device 40 itself (Step S101). The information also includes information on the capability of the first coding and the capability of the second coding. The terminal device 40 may give information on the terminal capability during a procedure of initial access or after the initial access. Note that, for example, at least one of a physical random access channel (PRACH), a physical uplink control channel (PUCCH), and a physical uplink shared channel (PUSCH) may be used as a physical channel for the notification.

The base station 20 notifies the terminal device 40 connected to a cell managed by the base station itself of semi-static control information including information on the first coding and the second coding (Step S102). The semi-static control information may be cell-specific control information. The base station 20 may give the semi-static control information during a procedure of initial access or after the initial access. Furthermore, the base station 20 may give the control information as a part of a procedure of RRC such as RRC signaling, RRC configuration, and RRC reconfiguration. Furthermore, the base station 20 may periodically notify the terminal device 40 of the control information. At least one of a physical broadcast channel (PBCH), a physical downlink control channel, an enhanced physical downlink control channel (EPDCCH), and a physical downlink shared channel may be used as a physical channel for giving the control information.

When receiving the semi-static control information, the terminal device 40 makes a setting related to coding based on the information on the first coding and the second coding included in the received control information (Step S103).

Thereafter, when downlink communication occurs from the base station 20 to the terminal device 40, the base station 20 transmits dynamic control information to the terminal device 40. Examples of a case where the downlink communication occurs include a case where the terminal device 40 requests data download (pull) and a case where push data occurs to the terminal device 40. The dynamic control information may be terminal-specific (UE-specific) control information or terminal-group-specific (UE-group-specific) control information. Here, the terminal group is, for example, one or more groups of terminal devices 40 serving as transmission destinations in a case where the downlink communication is multicast or broadcast.

Note that the dynamic control information can include various pieces of information such as information on radio resources used for performing the downlink communication. For example, the dynamic control information can include, for example, information on various resources for allocating downlink communication to target terminal devices 40 (group of terminal devices 40). More specifically, the dynamic control information can include, for example, the following pieces of information (1) to (8).

(1) Frequency resources (e.g., resource block, subcarrier, and subcarrier group)
(2) Time resources (e.g., subframe, slot, mini-slot, and symbol)
(3) Spatial resources (e.g., antenna, antenna port, spatial layer, and spatial stream)
(4) Non-orthogonal resources (e.g., resources related to power, interleave pattern, scrambling pattern, and diffusion pattern) related to predetermined communication (e.g., non-orthogonal multiple access (NOMA), multiuser superposition transmission (MUST), interleave division multiple access (IDMA), and code division multiple access (CDMA))
(5) Information on modulation order and code rate of second coding (e.g., modulation and coding set (MCS))
(6) Error correction coding method used in first coding
(7) Information on code rate of first coding
(8) Setting related to ARQ/HARQ (e.g., new data indicator (NDI) and redundancy version (RV))

The terminal device 40 that has received the dynamic control information makes a setting for preparing for appropriate reception of the downlink communication in accordance with the control information (Step S105).

Next, the base station 20 performs the first coding, the second coding, and modulation on data of the downlink communication to the terminal device 40 in accordance with the control information of which the terminal device 40 has been notified (Step S106). The base station 20 transmits the coded and modulated data to the terminal device 40 (Step S107).

When receiving the data from the base station 20, the terminal device 40 executes various pieces of processing (reception processing, demodulation processing, and decoding processing) including the first coding and the second coding in accordance with the setting specified by the control information (Step S107). Then, the terminal device 40 returns ACK or NACK to the base station 20 depending on whether the data decoding has succeeded or failed. Furthermore, the terminal device 40 desirably changes the setting of the ARQ/HARQ processing depending on whether the data decoding has succeeded or failed. For example, when the decoding fails, the terminal device 40 desirably stores a decoding result or data in the middle of decoding (e.g., soft decision value and log likelihood ratio (LLR)) in a memory in order to retransmit/synthesize the next HARQ. In the example of FIG. 13, the terminal device 40 has failed in decoding, executes ARQ/HARQ processing (Step S109), and returns NACK to the base station 20 (Step S110).

The base station 20 executes processing to be performed next in accordance with a response (ACK/NACK) received from the terminal device 40. For example, when receiving a notification of NACK, the base station 20 prepares for retransmission of ARQ/HARQ (Step S111). Examples of the preparation for retransmission include RV selection, MCS selection, and radio resource selection. Note that, when receiving ACK from the terminal device 40, the base station 20 shifts to communication of the next new data since the reception of ACK means that target data was successfully transmitted and received without any problem.

The base station 20 shifts to execution of retransmission or downlink communication of new data in accordance with ARQ/HARQ processing in accordance with the above-described response (ACK/NACK). Thus, the base station 20 notifies the target terminal device 40 of the dynamic control information again, and executes the downlink communication in accordance with the setting.

In the example of FIG. 13, since having received NACK from the terminal device 40 (Step S110), the base station 20 executes ARQ/HARQ processing (Step S111), and notifies the terminal device 40 of the dynamic control information again (Step S112). The terminal device 40 that has received the dynamic control information makes a setting for preparing for appropriate reception of the downlink communication in accordance with the control information (Step S113). The base station 20 performs the first coding, the second coding, and modulation on data of the downlink communication to the terminal device 40 in accordance with the control information of which the terminal device 40 has been notified (Step S114), and retransmits coded and modulated data to the terminal device 40 (Step S115).

Then, the terminal device 40 synthesizes data based on a retransmission signal (Step S116), and executes various pieces of processing (reception processing, demodulation processing, and decoding processing) including the first coding and the second coding on the synthesized data in accordance with the setting specified by the control information (Step S117). In the example of FIG. 13, the terminal device 40 has succeeded in decoding here, executes ARQ/HARQ processing (Step S118), and returns ACK to the base station 20 (Step S110).

The base station 20 that has received ACK executes ARQ/HARQ processing, and shifts to communication of the next new data.

3-2. Details of Operation of Communication System

Next, the operation of the communication system 1 will be described in detail.

Although the introduction of packet duplication improves communication reliability, frequency utilization efficiency is remarkably reduced since the same data is transmitted through a plurality of channels. The communication device of the embodiment generates a plurality of bit sequences having different contents by applying the first coding processing based on the first error correction coding method to a transmission data sequence, and distributes and transmits the plurality of bit sequences to a plurality of channels. Thereby, high frequency utilization efficiency is achieved while communication reliability is maintained. An example of a specific method for achieving this will be described below.

3-2-1. Overall Image of Signal Processing

First, an overall image of signal processing of the embodiment will be described.

Figure 14:
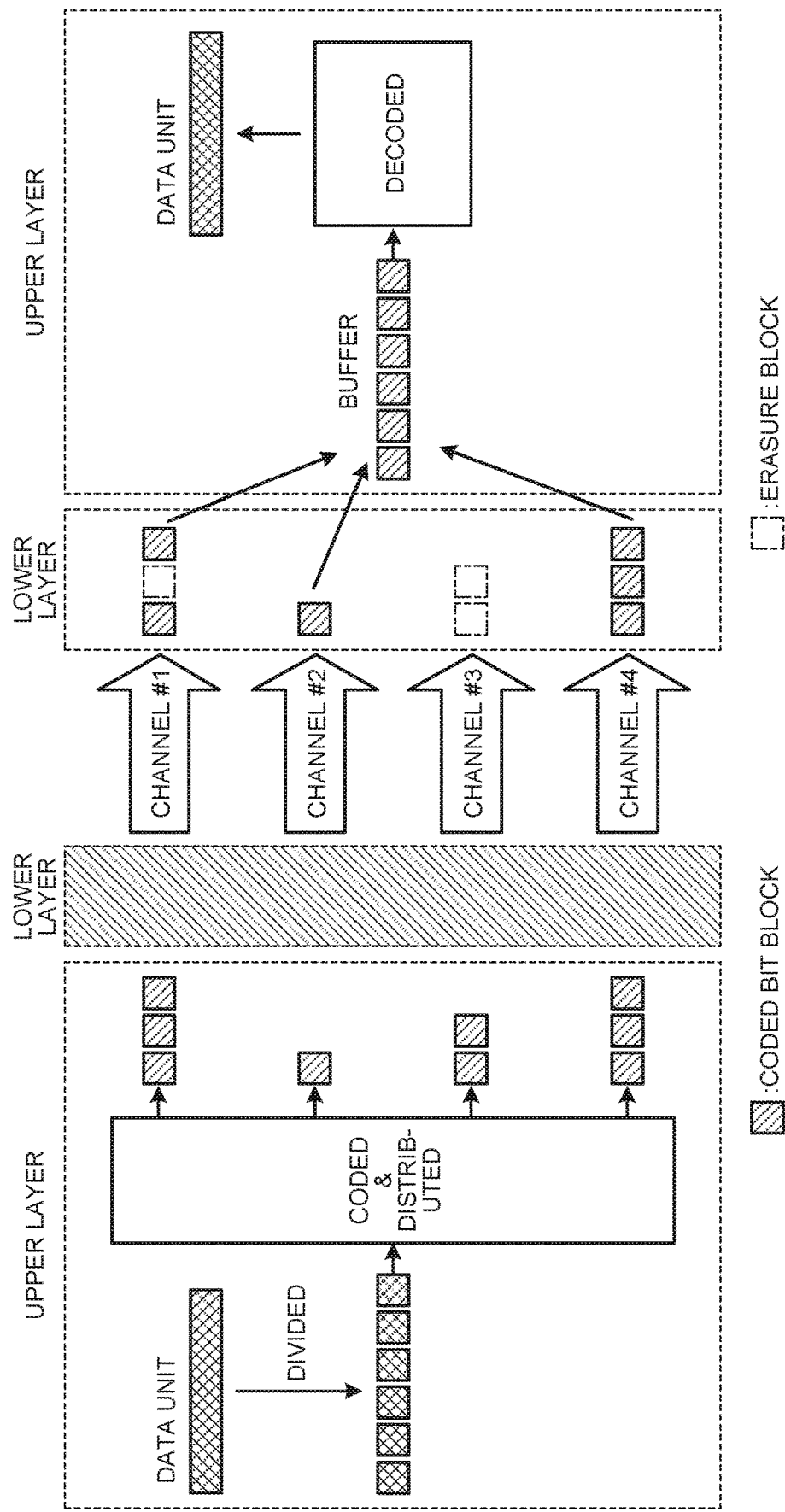
FIG. 14 illustrates an overall image of signal processing of the embodiment.

FIG. 14 illustrates the overall image of the signal processing of the embodiment. The signal processing of the embodiment will be specifically described with reference to FIG. 14. A communication device on a transmission side divides a single data unit into a plurality of source bit blocks. Here, the single data unit corresponds to the one bit sequence (transmission data sequence) in FIG. 11. The plurality of source bit blocks corresponds to the plurality of source bit sequences in FIG. 11. Thereafter, the communication device on the transmission side performs the first coding on the source bit blocks to generate a plurality of coded bit blocks. The coded bit blocks correspond to the plurality of bit sequences in FIG. 11. Then, the communication device on the transmission side distributes the generated coded bit blocks to a plurality of available independent channels, and transmits the coded bit blocks to a communication device on a reception side. The communications device on the reception side decodes the single data unit by using the bit blocks received from the independent channels.

Here, the data unit may be, for example, a protocol data unit (PDU) or a service data unit (SDU) handled in a PDCP layer, an RLC layer, and a MAC layer in the 3GPP standard. Furthermore, the data unit may include a plurality of data units, or may include those obtained by dividing the single data unit. Furthermore, the data unit may be defined in units of codewords (CWs) of a PHY layer.

The overall image of the signal processing has been described above. Pieces of processing (bit block unit division, coding, and distribution) serving as elements of the embodiment will be described in detail.

3-2-2. Bit Block Unit Division

The communication device on the transmission side divides a data unit into bit blocks having any size. Here, the bit blocks are a bit group generated by dividing a data unit into a plurality of pieces. The name of the bit block is merely a temporary designation in the embodiment. The bit block may be called by another name such as a symbol. In the following description, the divided bit blocks are referred to as source bit blocks.

The bit blocks are generated by dividing a single data unit. The size of the bit blocks is determined based on prior information. When the communication device on the transmission side is the terminal device 40, the prior information may be, for example, information transmitted by the base station 20 to the terminal device 40 as semi-static or dynamic control information. The prior information may include at least one of, for example, QoS, 5QI, MCS, information of a header assigned in an upper layer, and information on an amount of frequency resources used in a physical layer. Of course, the prior information is not limited to these pieces of information.

Each of the generated bit blocks desirably has an equal size. Of course, each of the bit blocks is not required to have an equal size. Note that, when bit blocks having the same size are requested in the first coding processing, the communication device divides a data unit such that a plurality of bit blocks has an equal size. In this case, if the bit block size determined by the prior information is not the integral multiple of the bit number of the data unit, the communication device may make each bit block size uniform as follows.

First, the communications device separates bit blocks from the data unit until a quotient of the data unit and a bit block size becomes an integer value that does not exceed the bit number of the data unit. The communication device performs zero padding on the bits of the data unit remaining after the processing until the bit block size is reached. As a result, a plurality of bit blocks having an equal size is generated from the data unit. Note that a method of making each bit block size uniform is not limited thereto.

3-2-3. Coding

Next, the communication device on the transmission side codes the plurality of bit blocks generated by dividing the data unit. The coding processing performed here corresponds to the above-described first coding processing. In the following description, each of the plurality of bit blocks generated after the first coding processing is called a coded bit block. The name of the coded bit block is merely a temporary designation in the embodiment. The coded bit block may be called by another name. For example, the coded bit block may be rephrased as a coded bit sequence, or may be simply rephrased as a bit sequence.

Figure 15:
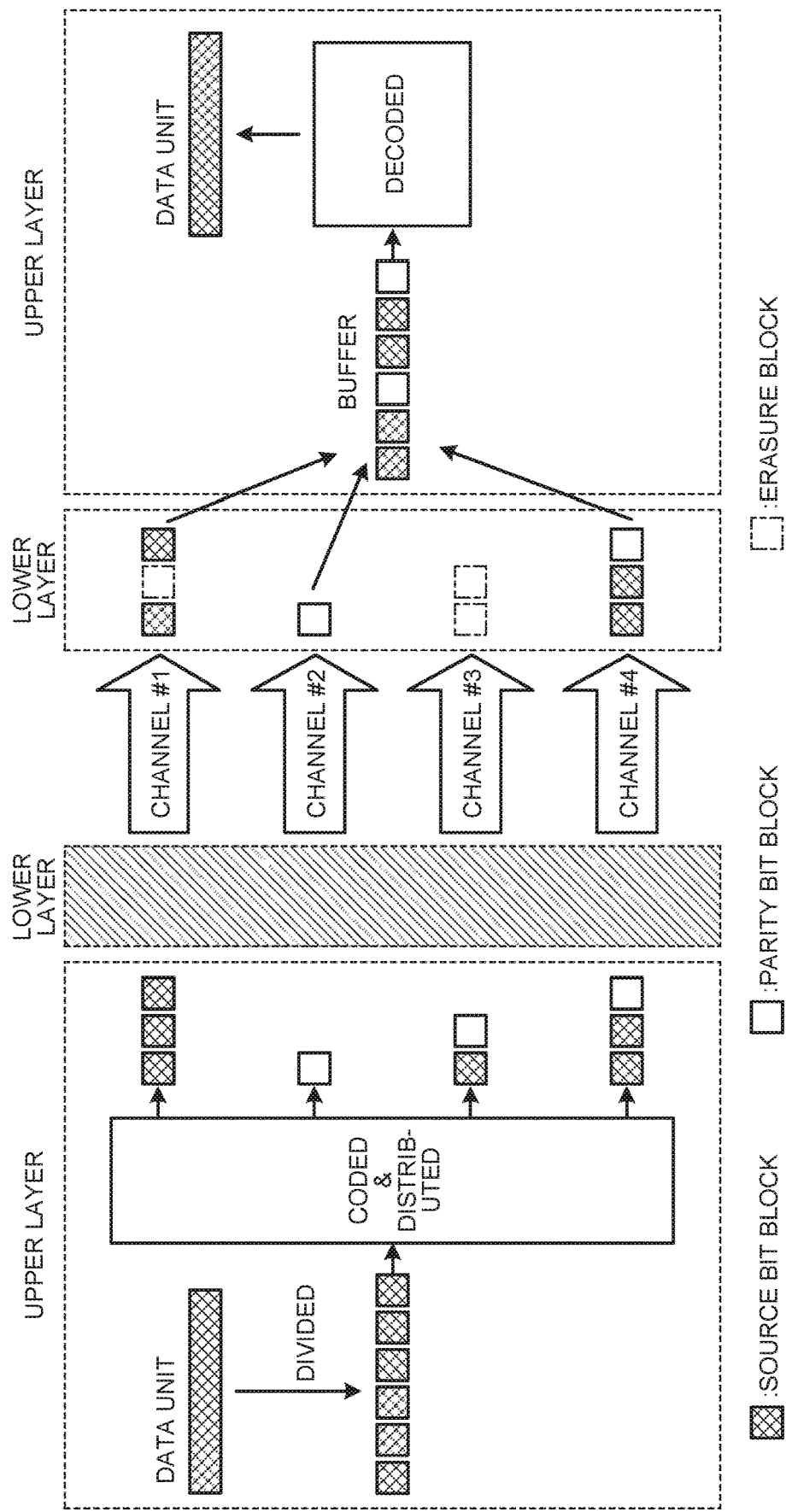
FIG. 15 illustrates a specific example of the overall image of the signal processing in FIG. 14.

The plurality of coded bit blocks may include a source-bit bit block and a parity bit block. FIG. 15 illustrates a specific example of the overall image of the signal processing in FIG. 14. In the example of FIG. 15, nine coded bit blocks include six source-bit bit blocks and three parity bit blocks. Note that the plurality of coded bit blocks is not necessarily required to include a source bit block as long as a communication layer on the reception side can finally decode the data data unit. For example, each coded bit block may be a bit block in which a parity bit sequence and a source bit sequence are mixed.

Here, the source bit block is a bit block group generated by a data unit division process before coding among the coded bit blocks. Furthermore, the parity bit block is parity generated by the error correction coding processing included in the first coding processing. The names of the source bit block and the parity bit block are merely temporary designations in the embodiment. The source bit block and the parity bit block may be called by other names. For example, the source bit block may be rephrased as a source bit sequence. Furthermore, the parity bit block may be rephrased as a parity bit sequence.

Note that the number of parity bit blocks to be generated may be determined based on preliminarily given information. When the communication device on the transmission side is the terminal device 40, the preliminarily given information may be, for example, information transmitted by the base station 20 to the terminal device 40 as semi-static or dynamic control information. Here, the preliminarily given information may include at least one of, for example, QoS, 5QI, MCS, and information included in a header assigned in an upper layer.

An ID unique to a bit block for identifying each bit block may be assigned to the coded bit block so that the communication device on the reception side can correctly perform decoding processing. For example, the ID may be defined by a serial number for a coded bit block group generated by one piece of first coding processing. The ID may be defined as an overhead assigned at the time of the first coding processing. Furthermore, the ID may be defined by cooperating with other information (e.g., sequence number (SN) assigned as header in upper layer processing) defined in 3GPP. Here, the ID is a name for description, and can be replaced with other identification information having the same concept as the ID.

A function capable of detecting an error for each bit block is assigned to the plurality of coded bit blocks. The function may be, for example, a cyclic redundancy check (CRC) or a checksum. The error detection function is assigned in any of, for example, the PDCP layer, the RLC layer, and the MAC layer on condition that the first coding processing is performed later.

3-2-4. Distribution

Next, the communication device on the transmission side distributes the plurality of coded bit blocks to a plurality of available channels. The communication device on the transmission side may equally divide the plurality of coded bit blocks to be transmitted by the number of the available channels, and allocate the same number of coded bit blocks to each channel. Furthermore, the communication device on the transmission side may acquire the states of the available channels as prior information, and distribute a plurality of coded bit blocks to a plurality of channels based on the information.

For example, it is assumed that the communication device on the transmission side transmits a plurality of coded bit blocks by using a channel A in a good state and a channel B in a bad state. Here, for example, the channel in a good state may have a degree of erasure smaller than a predetermined threshold or an error rate smaller than a predetermined threshold. Furthermore, for example, the channel in a bad state may have a degree of erasure larger than a predetermined threshold or an error rate larger than a predetermined threshold.

In this case, since higher-order modulation can be performed on the channel A in the physical layer, more coded bit blocks can be distributed. In contrast, since the channel B has a poor channel state, it is undesirable to perform high-order modulation. Thus, the communication device on the transmission side makes a setting to perform higher-order modulation on the channel A than on the channel B, and arranges more coded bit blocks in the channel A than in the channel B.

Note that the communication device on the transmission side may perform distribution processing by using information other than the above. Examples of the other information include the number of available frequency resources. For example, the communication device on the transmission side acquires information on the number of resources available for transmission of each of the plurality of channels. Then, the communication device on the transmission side distributes the plurality of coded bit blocks to the plurality of channels based on the acquired information on the number of resources. For example, the communication device on the transmission side distributes many coded bit blocks to a channel that can use many resources.

Furthermore, the communication device on the transmission side may distribute the plurality of coded bit blocks to a plurality of channels based on an amount of delay until transmission of each channel. For example, a case where communication is performed by using dual connectivity will be considered. Here, it is assumed that two independent channels are created by using a main gNB and a secondary gNB. When the plurality of coded bit blocks is transmitted by using a channel including the secondary gNB and the base station 20 (main gNB), some of the plurality of coded bit blocks need to be transmitted from the main gNB to the secondary gNB. Therefore, inter-base station communication between the main gNB and the secondary gNB causes processing delay, and a difference occurs in time of start to transmit a coded bit block between the main gNB and the secondary gNB.

Thus, the communication device on the transmission side may distribute a bit block to each independent channel in consideration of the delay due to the inter-base station communication. For example, the communication device on the transmission side distributes a smaller number of bit blocks to a channel with major delay than to a channel with minor delay. Note that, when distribution is performed in consideration of delay, a notification of an amount of delay may be preliminarily given from, for example, the management device 10. Furthermore, the communication device on the transmission side may perform distribution processing with the amount of delay as a fixed value.

Note that a method of distributing coded bit blocks is not limited to the above. The communication device on the transmission side may distribute the plurality of coded bit blocks to the plurality of channels by combining a plurality of methods including at least one of the above-described methods.

3-3. Sequence Example (Basic Form)

Figure 16:
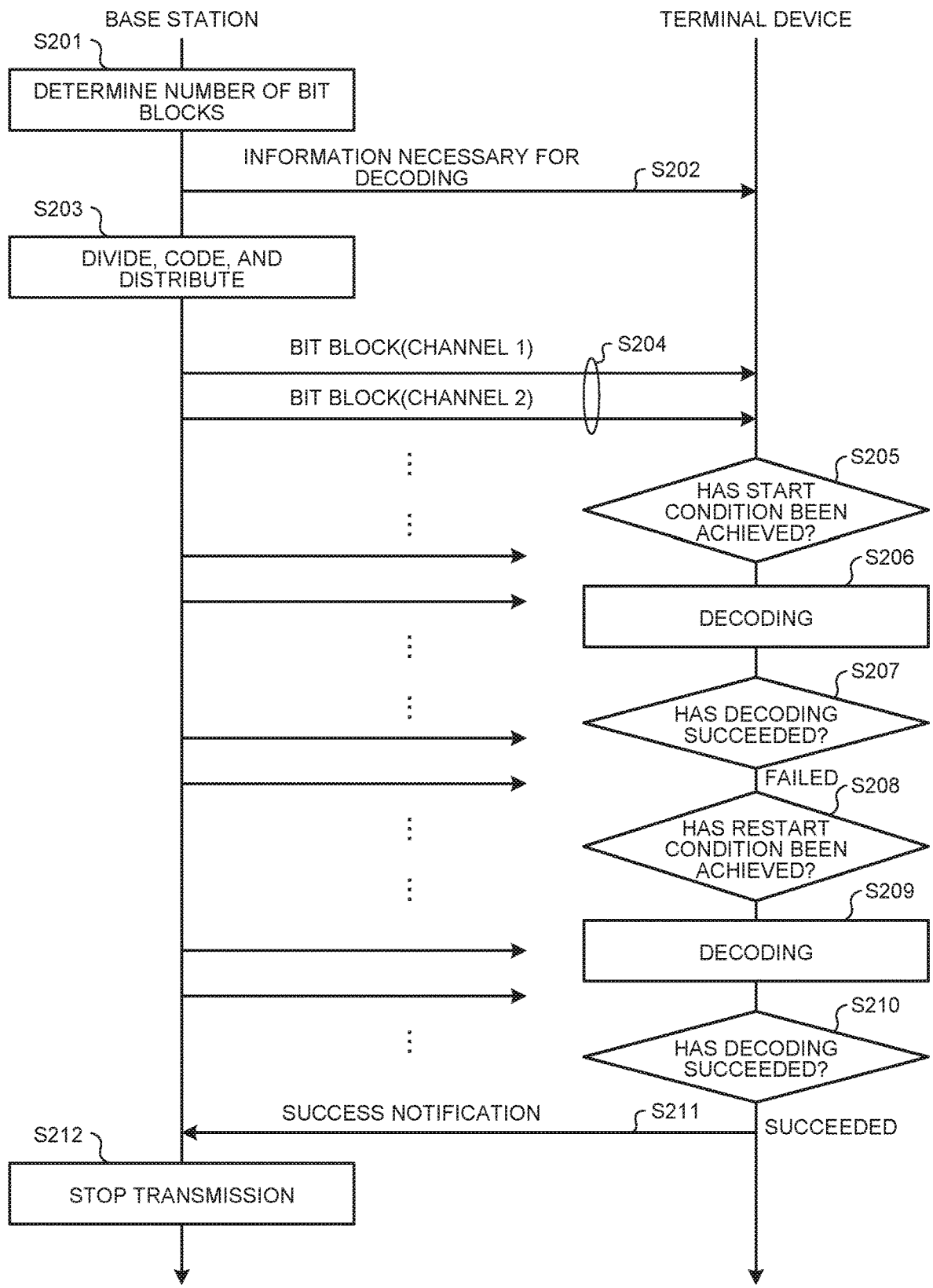
FIG. 16 illustrates a sequence example (basic form) of communication processing of the embodiment.

Next, a sequence example of communication processing of the embodiment will be described. First, a sequence example of a basic form will be described. FIG. 16 illustrates the sequence example (basic form) of the communication processing of the embodiment.

Note that, for example, one or a plurality of base stations 20, one or a plurality of relay stations 30, or one or a plurality of terminal devices 40 is assumed as the communication device on the transmission side. In contrast, for example, one terminal device 40 or one base station 20 is assumed as the communication device on the reception side. Although it is assumed in the example of FIG. 16 that two independent channels are used to transmit coded bit blocks, not two but another number of channels may be used. Furthermore, although, in the example of FIG. 16, the base station 20 is the communication device on the transmission side, and the terminal device 40 is the communication device on the reception side, the communication devices on the transmission side and the reception side are not limited to the example. For example, the base station 20 may be the communication device on the reception side, and the terminal device 40 may be the communication device on the transmission side.

For example, the control unit 23 of the base station 20 and the control unit 43 of the terminal device 40 may execute the following processing. The communication processing of the embodiment will be described below with reference to the sequence example of FIG. 16.

First, the acquisition unit 233 of the base station 20 acquires information necessary for coding (information on decoding processing) including information on a bit block. Then, the base station 20 determines the number of divisions and/or the number of bit blocks to be generated based on the acquired information (Step S201). Note that the information necessary for coding may be used to determine the following pieces of information (1) to (4).

(1) Coding Table Used in First Coding
(2) Number of Divisions of Bit Blocks
(3) Divided Bit Block Size
(4) Bit Block Distribution Note that the base station 20 may obtain these pieces of information from, for example, QoS, 5QI, MCS, information of a header assigned in an upper layer, and information on the number of frequency resources used in a physical layer.

Furthermore, the communication device on the transmission side may acquire information necessary for the coding from the communication device on the transmission side. For example, unlike the example of FIG. 16, it is assumed that the communication device on the transmission side is the terminal device 40 and the communication device on the reception side is the base station 20. In this case, the acquisition unit 433 of the terminal device 40 may acquire the information necessary for coding from the base station 20.

Next, the transmission unit 232 of the base station 20 transmits information necessary for decoding to the terminal device 40 (Step S202). The acquisition unit 233 of the terminal device 40 acquires the information necessary for decoding from the base station 20. In the embodiment, it is assumed that the base station 20 preliminarily transmits the information necessary for the terminal device 40 to perform decoding to the terminal device 40. The information necessary for decoding includes, for example, the following (1) to (5).

(1) Coding Table Used in Coding
(2) Number of Divisions of Bit Blocks
(3) Divided Bit Block Size
(4) Total Number of Source Bit Blocks
(5) Number of Decoding Start/Reception Success Bit Blocks Note that the base station 20 may assign these pieces of information to a bit block as an overhead instead of separately transmitting the information to the terminal device 40.

Next, for example, as described with reference to FIG. 14, the generation unit 234 of the base station 20 divides a data unit, and codes bit blocks generated by the division. Then, for example, as illustrated with reference to FIG. 14, the distribution unit 235 of the base station 20 distributes coded bit books (Step S203). Here, the base station 20 may assign overheads to a plurality of bit books in units of bit blocks. The overheads include, for example, the following pieces of information (1) to (3).

(1) Error Detection Function (e.g., CRC and Checksum)
(2) ID
(3) Coding Table

Note that the base station 20 is not necessarily required to assign all pieces of the above-described information as the overheads. Furthermore, the base station 20 may assign information other than the above as an overhead.

Next, the transmission unit 232 of the base station 20 transmits data including a coded bit block by using a plurality of channels (Step S204). Assumed examples of data transmitted here include data in units of transport blocks processed by a physical layer (e.g., subjected to second coding). The transmission data may include a plurality of coded bit blocks. Furthermore, the transmission data may include some of the plurality of coded bit blocks.

The reception unit 231 of the terminal device 40 receives data including coded bit blocks from a plurality of channels. Then, the terminal device 40 executes processing (e.g., second decoding processing) on the received data in the physical layer, and determines whether or not the coded bit blocks have been correctly received by using the error detection function assigned to the coded bit blocks. In this case, the terminal device 40 may perform the error detection independently for each channel before storing the coded bit blocks in a buffer.

When an error is detected in a coded bit block, the terminal device 40 discards the coded bit block. When a coded bit block can be correctly received, the terminal device 40 stores the coded bit block in the buffer.

Next, the start determination unit 436 of the terminal device 40 determines whether a start condition of decoding processing (hereinafter, referred to as decoding start condition) has been satisfied (Step S205). The decoding start condition may be determined based on the above-described information necessary for coding (information on decoding processing). For example, at least one of the following (C1) and (C2) is assumed as the decoding start condition.

(C1) Case where Coded Bit Blocks were Successfully Received in the Number Equal to or More than the Number of Source Bit Blocks, a Notification of which had been Preliminarily Given In a case of the first error correction coding method (in particular, in case of erasure code), sufficient performance cannot be obtained even if decoding is performed by using coded bit blocks in the number equal to or less than the number of source bit blocks. Therefore, it is effective from the viewpoint of efficiency to set the decoding start condition as (C1). In this case, the communication device on the transmission side may notify the communication device on the reception side of information on the number of source bit blocks. The information may be given by the above-described "information necessary for decoding", or may be given by an overhead in units of bit blocks.

(C2) Case where a Predetermined Number (Threshold) of Coded Bit Blocks are Stored in the Reception Side In the case of the first error correction coding method (in particular, in case of erasure code), the communication device on the transmission side can estimate rough decoding gain by the number of coded bit blocks reaching the reception side. The communication device on the transmission side may determine the number (threshold) serving as a decoding start condition based on the estimated decoding gain. Then, the communication device on the reception side may notify the communication device on the transmission side of the number (threshold) serving as a decoding start condition.

Note that the decoding start condition may include a condition other than the above. The communication device on the reception side may determine whether or not the decoding start condition has been satisfied by combining a plurality of conditions including at least one of the above-described conditions. Furthermore, the communication device on the reception side may change the condition to be used depending on the type or importance of received data. For example, when the received data is control data, the communication device on the reception side may determine whether or not the decoding start condition has been satisfied by using the above-described condition of (C2). When the received data is user data, the communication device on the reception side may determine whether or not the decoding start condition has been satisfied by using the above-described condition of (C1). The communication device may determine the type or importance of data based on 501 and QoS. The communication device may uniquely set the type or importance of data.

When the decoding start condition is satisfied, the decoding unit 437 of the terminal device 40 starts the first decoding processing (Step S206). In this case, when a decoding start criterion is satisfied, the decoding unit 437 starts the first decoding processing even before reception of all the plurality of coded bit blocks is completed.

Then, the decoding determination unit 438 of the terminal device 40 determines whether a decoding success condition has been satisfied (Step S207). For example, at least one of the following (D1) and (D2) is assumed as the decoding success condition. Of course, the decoding success condition may include a condition other than the above.

(D1) Case where Decoded Data Unit Includes No Error

The decoding determination unit 438 may set a case where a decoded data unit includes no error as a decoding success condition. When the decoding success condition is satisfied, the communication device on the reception side may notify the communication device on the transmission side of success of decoding. For example, the communication device on the reception side may give a notification of success when no error is detected in the decoded data unit. In order for the communication device on the transmission side to detect an error in units of data units, the communication device on the transmission side assigns a function of detecting an error to each of the data units before the data units are divided. The function includes, for example, CRC.

(D2) Case where a Predetermined Number of Reception Success Bit Blocks are Accumulated in a Buffer Note that the decoding determination unit 438 may give a decoding success notification before decoding actually succeeds on the assumption that the decoding success condition has been satisfied. For example, the decoding determination unit 438 may give a decoding success notification when the number of successfully received coded bit blocks reaches a predetermined number. In this case, the communication device on the transmission side may preliminarily notify the communication device on the reception side of the above-described information on the number. The information may be given by the above-described "information necessary for decoding", or may be given by an overhead in units of bit blocks.

Note that the decoding success condition may include a condition other than the above. The communication device on the reception side may determine whether or not the decoding success condition has been satisfied by combining a plurality of conditions including at least one of the above-described conditions.

Furthermore, the communication device on the reception side may change the condition to be used depending on the type or importance of received data. For example, when the received data is control data, the communication device on the reception side may determine whether or not the decoding start condition has been satisfied by using the above-described condition of (D1). When the received data is user data, the communication device on the reception side may determine whether or not the decoding start condition has been satisfied by using the above-described condition of (D2). The communication device may determine the type or importance of data based on 501 and QoS. The communication device may uniquely set the type or importance of data.

When the decoding success condition is not satisfied, the start determination unit 436 of the terminal device 40 discards output data at the time of decoding, and determines whether a restart condition of the first decoding processing (hereinafter, referred to as decoding restart condition) has been satisfied (Step S208). The start determination unit 436 may set a case where the number of successfully received coded bit blocks is larger than the number of that at the time of decoding failure as the decoding restart condition. In the first code processing, a larger number of bit blocks to be input at the time of decoding improves decoding gain. This is because, if the number of successfully received coded bit blocks is larger than that at the time of decoding failure, decoding may succeed by follow-up decoding.

Note that, in order to determine whether or not a decoding restart condition is satisfied, the start determination unit 436 may monitor a buffer that stores the successfully received coded bit blocks. Note that, in the embodiment, the communication device on the transmission side continues to transmit the coded bit blocks until receiving a transmission success notification. Therefore, in the embodiment, it is assumed that the number of successfully received coded bit blocks increases even while the communication device on the reception side performs the reception processing and the code processing.

When the decoding restart condition is satisfied, the decoding unit 437 of the terminal device 40 restarts the first decoding processing (Step S209). For example, when the number of successfully received coded bit blocks is larger than that at the time of decoding failure, the decoding unit 437 executes the first decoding processing by using the coded bit blocks stored in the buffer.

Then, the decoding determination unit 438 of the terminal device 40 determines again whether or not a decoding success condition has been satisfied (Step S210). When the decoding success condition is satisfied, the transmission unit 232 of the terminal device 40 transmits a decoding success notification to the base station 20 (Step S211). The success notification is transmitted for controlling bit block transmission on the transmission side.

When receiving the decoding success notification, the base station 20 stops generating coded bit blocks and transmitting the coded bit blocks (Step S212).

3-4. Sequence Example (Variation 1)

Figure 17:
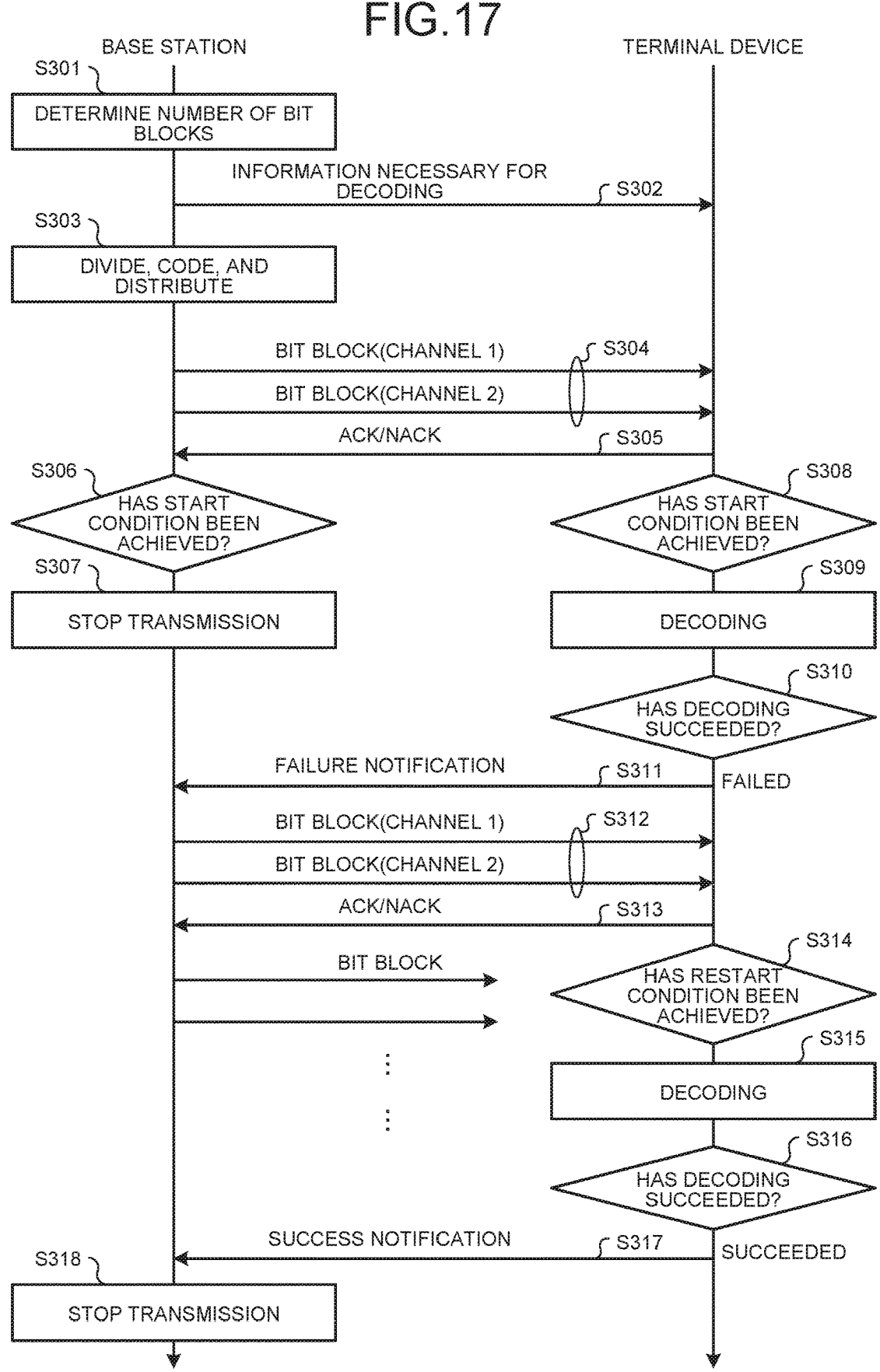
FIG. 17 illustrates a sequence example (Variation 1) of the communication processing of the embodiment.

Next, a variation of the sequence example (basic form) in FIG. 16 will be described. FIG. 17 illustrates the sequence example (Variation 1) of the communication processing of the embodiment.

In the example of FIG. 17, the communication device on the reception side detects an error in units of coded bit blocks, and then transmits a response (ACK/NACK) of whether or not each coded bit block has been correctly received to the communication device on the transmission side. This enables the communication device on the transmission side to determine whether or not to continue transmitting the coded bit blocks without waiting for a notification of a result of decoding processing of the communication device on the reception side.

Note that, although it is assumed in the example of FIG. 17 that two independent channels are used to transmit coded bit blocks similarly to the example of FIG. 16, not two but another number of channels may be used. Furthermore, although, in the example of FIG. 17, the base station 20 is the communication device on the transmission side, and the terminal device 40 is the communication device on the reception side similarly to the example of FIG. 16, the communication devices on the transmission side and the reception side are not limited to the example. For example, the base station 20 may be the communication device on the reception side, and the terminal device 40 may be the communication device on the transmission side.

For example, the control unit 23 of the base station 20 and the control unit 43 of the terminal device 40 may execute the following processing. The communication processing of the embodiment will be described below with reference to the sequence example of FIG. 17.

First, the acquisition unit 233 of the base station 20 acquires information necessary for coding. Then, the base station 20 determines the number of divisions and/or the number of bit blocks to be generated based on the acquired information (Step S301). Then, the transmission unit 232 of the base station 20 transmits information necessary for decoding to the terminal device 40 (Step S302). The acquisition unit 233 of the terminal device 40 acquires the information necessary for decoding from the base station 20.

Next, the generation unit 234 of the base station 20 divides a data unit, and codes bit blocks generated by the division. Then, the distribution unit 235 of the base station 20 distributes coded bit books (Step S303). Then, the transmission unit 232 of the base station 20 transmits data including a coded bit block by using a plurality of channels (Step S304).

The reception unit 431 of the terminal device 40 receives data including coded bit blocks from a plurality of channels. Then, the terminal device 40 executes the second decoding processing on the received data, and determines whether or not the coded bit blocks have been correctly received by using the error detection function assigned to the coded bit blocks. Then, the transmission unit 232 of the terminal device 40 transmits ACK/NACK based on the determination result (Step S306). When the transmission unit 232 can correctly receive a coded bit block, the transmission unit 232 transmits ACK. When the transmission unit 232 cannot correctly receive the coded bit block, the transmission unit 232 transmits NACK. The transmission unit 232 may transmit ACK/NACK each time the second decoding processing is executed on coded bit blocks. The reception unit 231 of the base station 20 receives ACK/NACK from the terminal device 40. Note that, when a coded bit block can be correctly received, the terminal device 40 stores the coded bit block in the buffer.

Next, the start determination unit 236 of the base station 20 determines whether a decoding start condition is satisfied in the terminal device 40 (Step S306). For example, the base station 20 preliminarily shares information on the decoding start condition with the terminal device 40. Then, the base station 20 determines whether the decoding start condition has been satisfied based on information on ACK received from the terminal device 40. For example, the base station 20 may determine whether the decoding start condition has been satisfied by counting the number of ACKs received from the terminal device 40. When the decoding start condition is satisfied, the transmission unit 232 of the base station 20 stops data transmission (Step S307).

Furthermore, the start determination unit 436 of the terminal device 40 also determines whether the decoding start condition has been satisfied (Step S308). When the decoding start condition is satisfied, the decoding unit 437 of the terminal device 40 starts the first decoding processing (Step S309). Then, the decoding determination unit 438 of the terminal device 40 determines whether a decoding success condition has been satisfied (Step S310).

When the decoding success condition is not satisfied, the terminal device 40 gives a decoding failure notification (Step S311). When receiving the failure notification, the transmission unit 432 of the base station 20 restarts the transmission of the coded bit blocks (Step S312). When receiving data, the terminal device 40 determines whether or not a coded bit block has been correctly received. Then, the transmission unit 232 of the terminal device 40 transmits ACK/NACK based on the determination result (Step S313).

Note that, when ACK is received but transmission of the coded bit blocks is restarted, the transmission unit 432 of the base station 20 is not required to stop the transmission of the coded bit blocks. Of course, the transmission unit 432 may stop the transmission of the coded bit blocks when receiving ACK.

The start determination unit 436 of the terminal device 40 determines whether the decoding restart condition has been satisfied (Step S314). When the decoding restart condition is satisfied, the decoding unit 437 of the terminal device 40 restarts the first decoding processing (Step S315).

Then, the decoding determination unit 438 of the terminal device 40 determines again whether or not a decoding success condition has been satisfied (Step S316). When the decoding success condition is satisfied, the transmission unit 232 of the terminal device 40 transmits a decoding success notification to the base station 20 (Step S317).

When receiving the decoding success notification, the base station 20 stops generating coded bit blocks and transmitting the coded bit blocks (Step S318).

3-5. Sequence Example (Variation 2)

Figure 18:
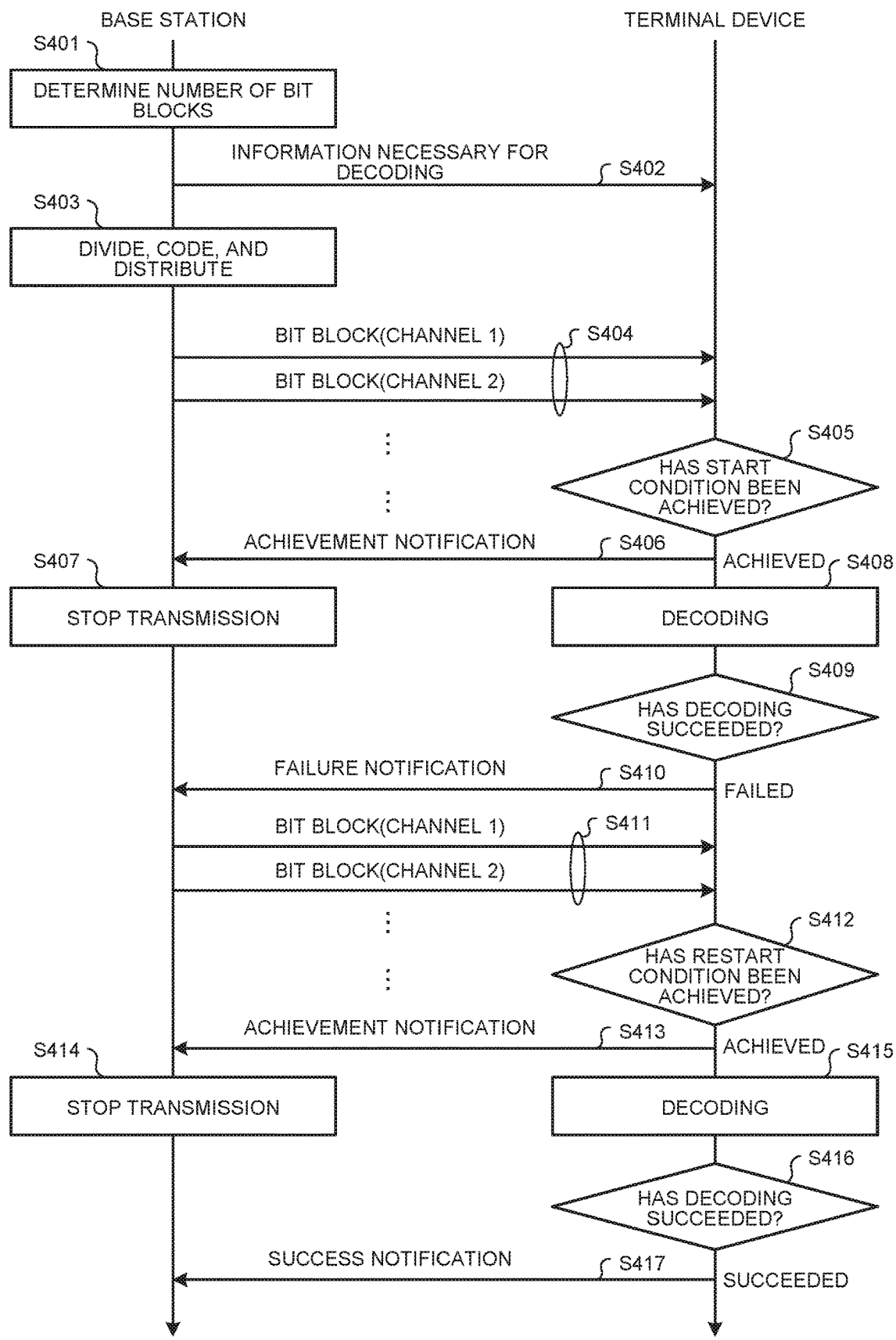
FIG. 18 illustrates a sequence example (Variation 2) of the communication processing of the embodiment.

Next, another variation of the sequence example (basic form) in FIG. 16 will be described. FIG. 18 illustrates the sequence example (Variation 2) of the communication processing of the embodiment.

In the example of FIG. 18, the communication device gives a decoding success notification before decoding actually succeeds on the assumption that the decoding success condition has been satisfied. Specifically, as described in (D2) above, when the number of successfully received coded bit blocks reaches a predetermined number, the communication device on the reception side notifies the terminal device on the transmission side of success of decoding. This enables the communication device on the transmission side to determine whether or not to continue transmitting the coded bit blocks without waiting for a notification of a result of decoding processing of the communication device on the reception side. In the example, the communication device on the reception side does not necessarily need to perform error detection in units of data units after decoding. Therefore, in the example of FIG. 18, the communication device on the reception side may omit assignment of the error detection function in units of data units. Note that the communication device may determine whether or not to omit the assignment of the error detection function in accordance with the type or importance of transmission data.

When data to be handled does not need high reliability, the method in FIG. 18 may be selected instead of the method in FIG. 16. The communication device can ignore delay due to retransmission and decoding processing by using the method in FIG. 18, and can perform communication with lower delay. Whether or not the data needs high reliability may be determined based on the type or importance of the data. The communication device may determine the type or importance of the data based on 5QI and QoS, or the communication device may determine the type or importance based on a unique criterion.

Note that, although it is assumed in the example of FIG. 17 that two independent channels are used to transmit coded bit blocks similarly to the example of FIG. 16, not two but another number of channels may be used. Furthermore, although, in the example of FIG. 17, the base station 20 is the communication device on the transmission side, and the terminal device 40 is the communication device on the reception side similarly to the example of FIG. 16, the communication devices on the transmission side and the reception side are not limited to the example. For example, the base station 20 may be the communication device on the reception side, and the terminal device 40 may be the communication device on the transmission side.

For example, the control unit 23 of the base station 20 and the control unit 43 of the terminal device 40 may execute the following processing. The communication processing of the embodiment will be described below with reference to the sequence example of FIG. 17.

First, the acquisition unit 233 of the base station 20 acquires information necessary for coding. Then, the base station 20 determines the number of divisions and/or the number of bit blocks to be generated based on the acquired information (Step S401). Then, the transmission unit 232 of the base station 20 transmits information necessary for decoding to the terminal device 40 (Step S402). The acquisition unit 233 of the terminal device 40 acquires the information necessary for decoding from the base station 20.

Next, the generation unit 234 of the base station 20 divides a data unit, and codes bit blocks generated by the division. Then, the distribution unit 235 of the base station 20 distributes coded bit books (Step S403). Then, the transmission unit 232 of the base station 20 transmits data including a coded bit block by using a plurality of channels (Step S404).

The reception unit 231 of the terminal device 40 receives data including coded bit blocks from a plurality of channels. Then, the terminal device 40 executes the second decoding processing on the received data, and determines whether or not the coded bit blocks have been correctly received by using the error detection function assigned to the coded bit blocks. Then, the terminal device 40 stores a correctly received coded bit block in the buffer.

Next, the start determination unit 436 of the terminal device 40 determines whether the decoding start condition has been satisfied (Step S405). When the decoding start condition is satisfied, the transmission unit 432 of the terminal device 40 transmits a notification indicating that the decoding start condition has been satisfied (hereinafter, referred to as achievement notification) to the base station 20 (Step S406). Note that, when the decoding start condition is satisfied, the transmission unit 432 may transmit a decoding success notification to the base station 20 instead of the achievement notification regardless of whether or not the decoding processing has ended. Note that the base station 20 may regard the achievement notification as a decoding success notification.

Note that the terminal device 40 may change a transmission condition of the decoding success notification depending on the type or importance of received data. For example, when the received data is control data, the transmission unit 432 of the terminal device 40 notifies the base station 20 of success of decoding in a case where decoding actually succeeds (where decoding success condition is satisfied). In contrast, when the received data is user data, the transmission unit 432 notifies the base station 20 of success of decoding regardless of whether or not the decoding processing has ended in a case where the decoding start condition is satisfied. The communication device may determine the type or importance of data based on 501 and QoS. The terminal device 40 or the base station 20 may uniquely set the type or importance of data.

When receiving the achievement notification (or decoding success notification), the transmission unit 232 of the base station 20 stops data transmission (Step S407).

Furthermore, when the decoding start condition is satisfied, the decoding unit 437 of the terminal device 40 starts the first decoding processing (Step S408). Then, the decoding determination unit 438 of the terminal device 40 determines whether a decoding success condition has been satisfied (Step S409).

When the decoding success condition is not satisfied, the terminal device 40 gives a decoding failure notification (Step S410). When receiving the failure notification, the transmission unit 432 of the base station 20 restarts the transmission of the coded bit blocks (Step S411). When receiving data, the terminal device 40 determines whether or not a coded bit block has been correctly received. Then, the terminal device 40 stores a correctly received coded bit block in the buffer.

The start determination unit 436 of the terminal device 40 determines whether the decoding restart condition has been satisfied (Step S412). When the decoding restart condition is satisfied, the transmission unit 432 of the terminal device 40 transmits a notification of achievement of the decoding restart condition to the base station 20. When receiving the achievement notification, the transmission unit 232 of the base station 20 stops data transmission (Step S414).

Furthermore, when the decoding restart condition is satisfied, the decoding unit 437 of the terminal device 40 restarts the first decoding processing (Step S415). Then, the decoding determination unit 438 of the terminal device 40 determines again whether or not a decoding success condition has been satisfied (Step 416). When the decoding success condition is satisfied, the transmission unit 232 of the terminal device 40 transmits a decoding success notification to the base station 20 (Step S417).

3-6. Sequence Example (Variation 3)

Figure 19:
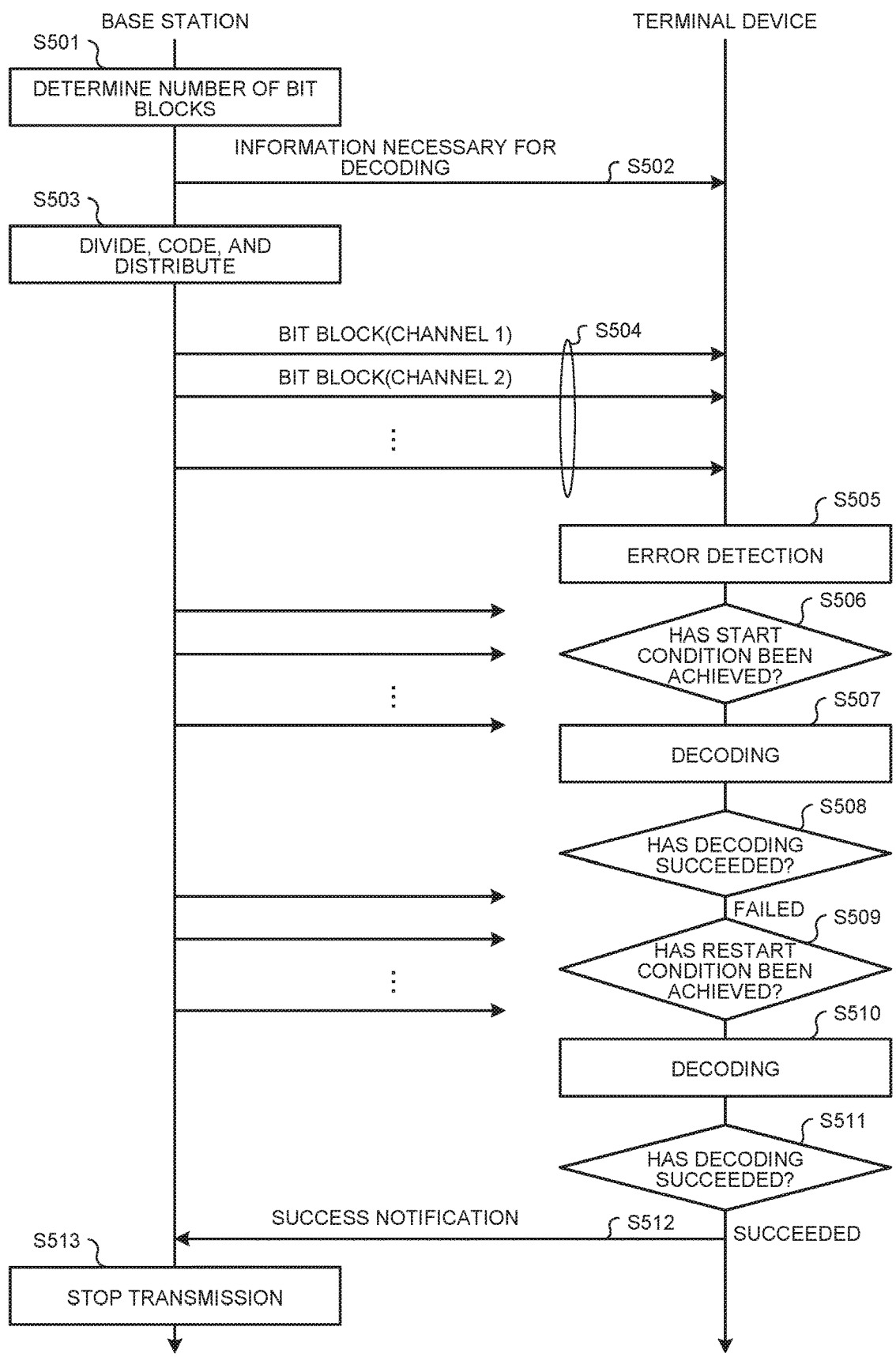
FIG. 19 illustrates a sequence example (Variation 3) of the communication processing of the embodiment.

Next, another variation of the sequence example (basic form) in FIG. 16 will be described. FIG. 19 illustrates the sequence example (Variation 3) of the communication processing of the embodiment.

In the example of FIG. 19, the communication device on the reception side once stores bit blocks arriving from all channels in the buffer before performing the error detection in units of coded bit blocks. This enables bit block right/wrong determination to be performed not independently for each channel. When, for example, the communication device on the reception side transmits ACK/NACK in units of coded bit blocks, the configuration can be thereby simplified.

First, the acquisition unit 233 of the base station 20 acquires information necessary for coding. Then, the base station 20 determines the number of divisions and/or the number of bit blocks to be generated based on the acquired information (Step S501). Then, the transmission unit 232 of the base station 20 transmits information necessary for decoding to the terminal device 40 (Step S502). The acquisition unit 233 of the terminal device 40 acquires the information necessary for decoding from the base station 20.

Next, the generation unit 234 of the base station 20 divides a data unit, and codes bit blocks generated by the division. Then, the distribution unit 235 of the base station 20 distributes coded bit books (Step S503). Then, the transmission unit 232 of the base station 20 transmits data including a coded bit block by using a plurality of channels (Step S504). Note that the transmission unit 232 of the base station 20 may repeatedly transmit the same data.

The reception unit 231 of the terminal device 40 receives data including coded bit blocks from a plurality of channels. In the sequence example, the terminal device 40 stores a plurality of coded bit blocks transmitted from a plurality of channels in one buffer, and then performs the error detection. Specifically, the terminal device 40 once stores a plurality of coded bit blocks included in a plurality of pieces of data received from respective channels in the buffer. Then, the terminal device 40 executes the second decoding processing on the data stored in the buffer, and determines whether or not the coded bit blocks have been correctly received by using the error detection function assigned to the coded bit blocks (Step S505). When an error is detected in a coded bit block, the terminal device 40 discards the coded bit block.

Next, the start determination unit 436 of the terminal device 40 determines whether the decoding start condition has been satisfied (Step S506). When the decoding start condition is satisfied, the decoding unit 437 of the terminal device 40 starts the first decoding processing (Step S507). Then, the decoding determination unit 438 of the terminal device 40 determines whether a decoding success condition has been satisfied (Step S508).

When the decoding success condition is not satisfied, the start determination unit 436 of the terminal device 40 determines whether the decoding restart condition has been satisfied (Step S509). When the decoding restart condition is satisfied, the decoding unit 437 of the terminal device 40 restarts the first decoding processing (Step S510). Then, the decoding determination unit 438 of the terminal device 40 determines again whether or not a decoding success condition has been satisfied (Step 511). When the decoding success condition is satisfied, the transmission unit 232 of the terminal device 40 transmits a decoding success notification to the base station 20 (Step S512).

When receiving the decoding success notification, the base station 20 stops generating coded bit blocks and transmitting the coded bit blocks (Step S513).

4. Reliability Evaluation

Next, a result of reliability evaluation of the technology disclosed in the embodiment will be described. Here, a comparison between a configuration using the embodiment and a configuration using a conventional method will be described.

The configuration using the embodiment was evaluated by simulating frequency utilization efficiency of communication. In the simulation, the superiority of a method using the first coding processing (upper layer FEC) of the embodiment is verified by simulation. Conventional technology to be compared is PDCP duplication. In particular, in the verification, attention is paid to improved frequency utilization efficiency, and simulation in which the result can be seen was constructed.

Figure 20:
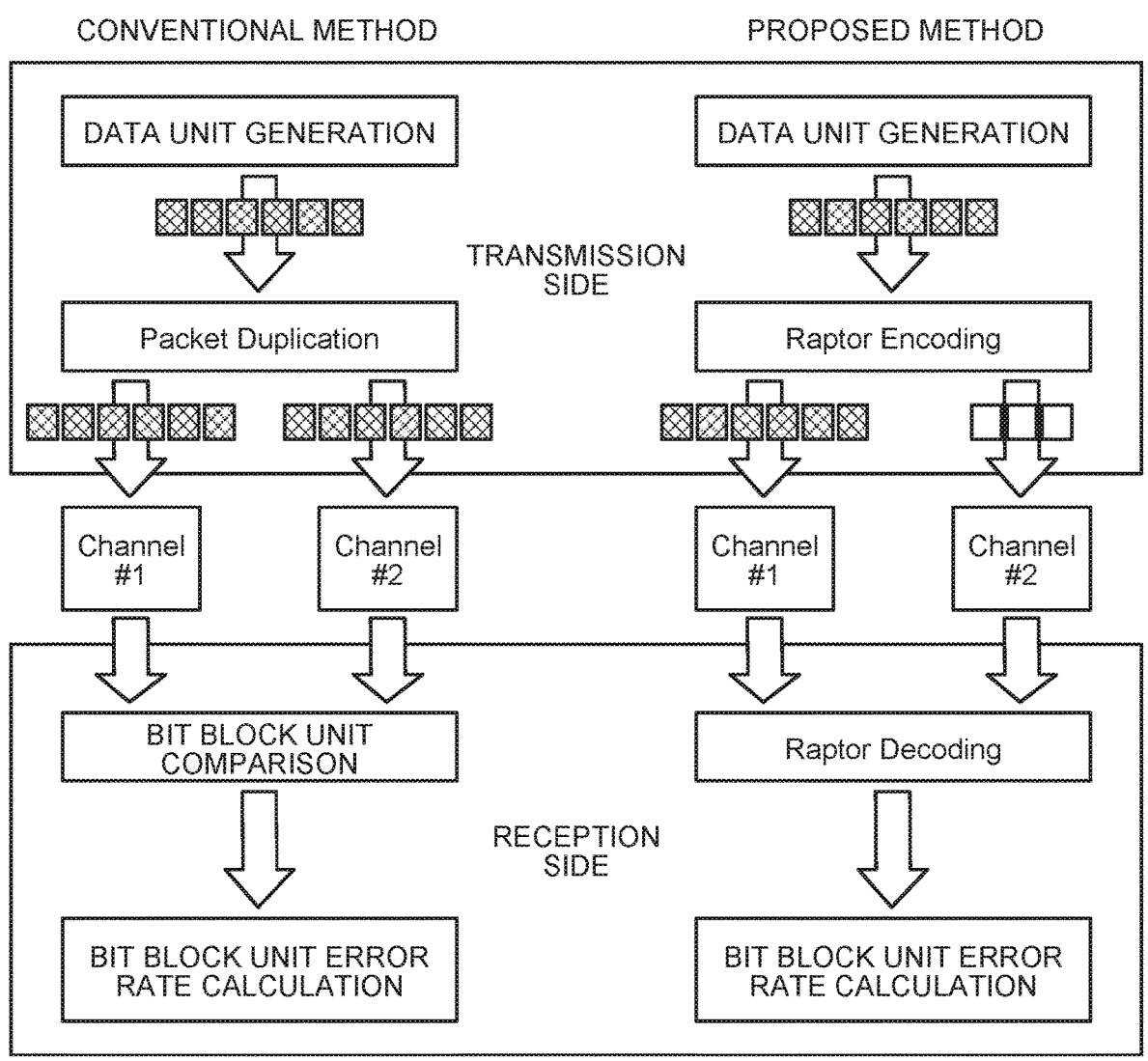
FIG. 20 outlines constructed simulation.

FIG. 20 outlines the constructed simulation. In order to pay attention to improving the frequency utilization efficiency of a proposed method, this time, simulation was constructed by extracting only an element necessary for verification from a 5G protocol. A device that executes the simulation is simply referred to as an information processing device below.

First, a conventional method will be described. First, the information processing device creates a transmission data block having any length by using randomly generated bits. Thereafter, the information processing device duplicates the transmission data block. The information processing device divides both the transmission data blocks into any number of pieces having an equal length in the same procedure. As a result, the information processing device creates any number of bit blocks.

The created bit block and a duplication thereof pass through separate erasure channels. The bit block erasure rate at the time is the same value in each erasure path, and any value is exhibited. A bit block erased by a bit block erasure channel is discarded on the spot. It is set to be recognizable on the reception side for each channel that at what number a bit block that had not been erased has been transmitted.

Decoding processing is performed on the reception side. When one of an original bit block and a duplicated bit block among a plurality of bit blocks transmitted through individual channels is erased and the other is not erased, the bit block is defined to be correctly received. When this can be correctly transmitted to all the bit blocks constituting a transmission data block, transmission of the transmission data block is a success. That is, when the original bit block created from the transmission data block and the duplicated bit block are simultaneously erased in individual channels, transmission of the transmission data block is a failure regardless of a reception status of other bit blocks.

In contrast, in the proposed method, the information processing device preliminarily creates any number of bit blocks for transmission blocks including randomly generated bits. Thereafter, Raptor coding is performed by using the generated bit blocks. The Raptor code is one of error correction code methods assumed to be used in the first coding processing. A parameter of a Raptor code used in the case follows IETF RFC 5053. The parity bit block generated by coding passes through a channel different from the channel for the generated data block. In the case, the state of a channel and processing of an erasure block are the same as those in the conventional method. Similarly, it is known on the reception side that at what number a received bit block has been transmitted. Raptor decoding is performed on the reception side by using bit blocks that have passed through respective channels and have been correctly received. When the transmission data block is correctly decoded, the transmission is a success.

FIG. 21 illustrates specifications of the simulation. In the simulation, the size of a transmission data block is set to 100 bits. The transmission data block was divided into bit blocks each having 10 bits. Furthermore, in relation to channel erasure rates, erasure rates in units of bit blocks are each set to 10% and 0.1% in units of transmission blocks.

In the simulator, how many parity bit blocks are needed to obtain performance equivalent thereto is verified based on reliability obtained by the conventional method. When a required total length of the parity bit blocks is shorter than a transmission data block at the time when the proposed method achieves the same reliability as the conventional method, the proposed method can be evaluated as having improved frequency utilization efficiency more than the conventional method.

Figure 22:
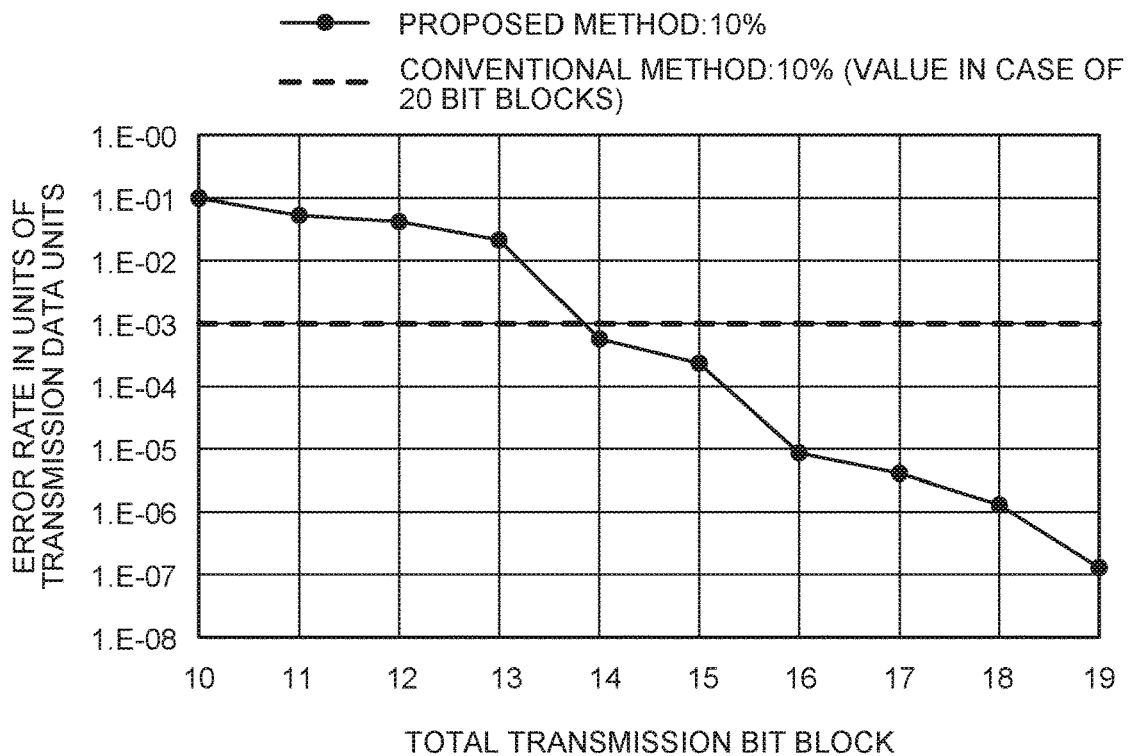
FIG. 22 illustrates a simulation result.
Figure 23:
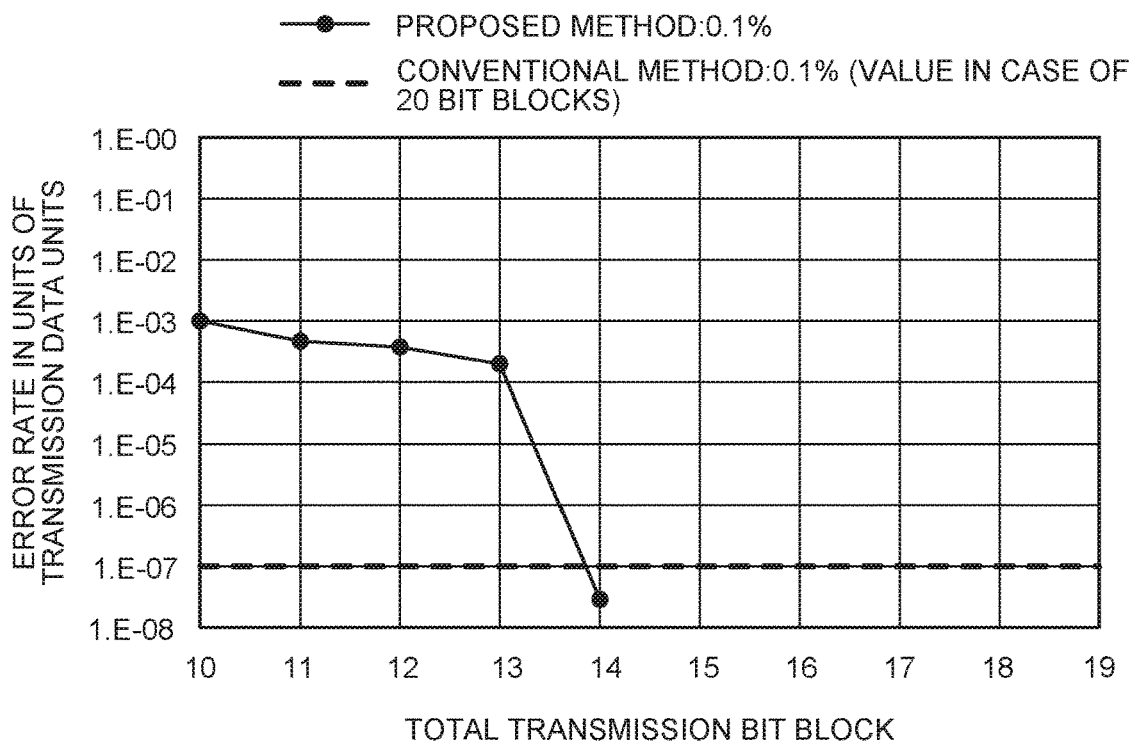
FIG. 23 illustrates a simulation result.

FIGS. 22 and 23 illustrate simulation results. Specifically, FIG. 22 illustrates a result of the total number of transmission bit blocks to a data unit error rate in a case of an erasure rate of 10%. Furthermore, FIG. 23 illustrates a result of the total number of transmission bit blocks to a data unit error rate in a case of an erasure rate of 0.1%. The total number of transmission bit blocks is obtained by adding the number of source bit blocks and the number of parity bit blocks. A broken line parallel to the horizontal axis in FIGS. 22 and 23 indicates a data unit error rate achieved by the conventional method in a case of a total of 20 bit blocks (10 transmission data bit blocks and 10 duplicated transmission source bit blocks).

As can be seen from FIGS. 22 and 23, the proposed method exceeds the conventional method in reliability in 10 transmission data bit blocks+four parity bit blocks regardless of the channel erasure rates. Furthermore, it can be confirmed that the decoding performance of the Raptor code used this time is greatly improved at the stage of arrival of four parity bit blocks. The characteristic is mainly because IETF RFC 5053 has been adopted as the configuration of the Raptor code. Note that, since the number of parity bit blocks necessary for decoding depends on the configuration of the first coding processing (upper layer FEC), another configuration is expected to change the value.

5. Variations

The above-described embodiment is one example, and various modifications and applications are possible.

For example, although, in the above-described embodiment, the communication device on the transmission side is the base station 20 and the communication device on the reception side is the terminal device 40, the communication device on the transmission side and the communication device on the reception side are not limited to the example. For example, the communication device on the transmission side may be the terminal device 40, and the communication device on the reception side may be the base station 20. Furthermore, the communication device on the transmission side may be the terminal device 40, and the communication device on the reception side may be the terminal device 40. Furthermore, the communication device on the transmission side may be the base station 20, and the communication device on the reception side may be the base station 20. In addition, either or both of the communication device on the transmission side and the communication device on the reception side may include the relay station 30.

A control device that controls the management device 10, the base station 20, the relay station 30, and the terminal device 40 of the embodiment may be implemented by a dedicated computer system or a general-purpose computer system.

For example, a communication program for executing the above-described operation is stored and distributed in a computer-readable recording medium such as an optical disk, a semiconductor memory, a magnetic tape, and a flexible disk. Then, for example, the program is installed in a computer, and the above-described processing is executed to constitute a control device. In this case, the control device may be a device (e.g., personal computer) outside the management device 10, the base station 20, the relay station 30, and the terminal device 40. Furthermore, the control device may be a device (e.g., control unit 13, control unit 23, control unit 33, and control unit 43) inside the management device 10, the base station 20, the relay station 30, and the terminal device 40.

Furthermore, the above-described communication program may be stored in a disk device of a server device on a network such as the Internet so that the communication program can be, for example, downloaded to a computer. Furthermore, the above-described functions may be implemented by cooperation of an operating system (OS) and application software. In this case, a part other than the OS may be stored in a medium and distributed, or the part other than the OS may be stored in a server device so that the part can be, for example, downloaded to a computer.

Furthermore, among pieces of processing described in the above-described embodiment, all or part of processing described as being performed automatically can be performed manually, or all or part of processing described as being performed manually can be performed automatically by a known method. In addition, the processing procedures, specific names, and information including various pieces of data and parameters in the above document and drawings can be optionally changed unless otherwise specified. For example, various pieces of information in each figure are not limited to the illustrated information.

Furthermore, each component of each illustrated device is functional and conceptual, and does not necessarily need to be physically configured as illustrated. That is, the specific form of distribution/integration of each device is not limited to the illustrated one, and all or part of the device can be configured in a functionally or physically distributed/integrated manner in any unit in accordance with various loads and usage situations. Note that the configuration by the distribution/integration may be dynamically performed.

Furthermore, the above-described embodiment can be appropriately combined in a region where the processing contents do not contradict each other. Furthermore, the order of steps in the flowcharts of the above-described embodiment can be appropriately changed.

Furthermore, for example, the embodiment can be carried out as any configuration constituting a device or a system, for example, a processor serving as a system large scale integration (LSI) or the like, a module using a plurality of processors or the like, a unit using a plurality of modules or the like, a set obtained by further adding other functions to the unit (i.e., configuration of part of device), and the like.

Note that, in the embodiment, a system means an assembly of a plurality of components (e.g., devices and modules (parts)), and it does not matter whether or not all the components are in the same housing. Therefore, a plurality of devices housed in separate housings and connected via a network and one device in which a plurality of modules is housed in one housing are both systems.

Furthermore, for example, the embodiment can adopt a configuration of cloud computing in which one function is shared and processed by a plurality of devices in cooperation via a network.

6. Conclusion

As described above, according to one embodiment of the present disclosure, the communication device (e.g., base station 20 and terminal device 40) of the embodiment performs radio communication by using a plurality of channels. The communication device generates a plurality of bit sequences having different contents by applying predetermined coding processing based on a predetermined error correction coding method to a transmission data sequence. Then, the communication device distributes and transmits the plurality of bit sequences to the plurality of channels. This enables the communication device of the embodiment to achieve high frequency utilization efficiency while maintaining communication reliability.

Although the embodiment of the present disclosure has been described above, the technical scope of the present disclosure is not limited to the above-described embodiment as it is, and various modifications can be made without departing from the gist of the present disclosure. Furthermore, components of different embodiments and variations may be appropriately combined.

Furthermore, the effects in the embodiment described in the present specification are merely examples and not limitations. Other effects may be exhibited.

Note that, the present technology can also have the configurations as follows.

(1)
A communication device that performs radio communication by using a plurality of channels, the communication device comprising:
 a generation unit that generates a plurality of bit sequences having different contents by applying coding processing based on a predetermined error correction coding method to a transmission data sequence; and
 a distribution unit that distributes the plurality of bit sequences to the plurality of channels.

(2)
The communication device according to (1),
wherein the distribution unit distributes the plurality of bit sequences to the plurality of channels based on a channel state of each of the plurality of channels.

(3)
The communication device according to (1),
wherein the distribution unit distributes the plurality of bit sequences to the plurality of channels based on an amount of delay until transmission of each of the plurality of channels.

(4)
The communication device according to (1),
wherein the distribution unit distributes the plurality of bit sequences to the plurality of channels based on an amount of a resource available for transmission of each of the plurality of channels.

(5)
The communication device according to any one of (1) to (4),
wherein the generation unit generates the plurality of bit sequences based on a plurality of source bit sequences generated by dividing the transmission data sequence and a plurality of parity bit sequences generated from the plurality of source bit sequences by using the predetermined error correction coding method.

(6)
The communication device according to (5), further comprising
 an acquisition unit that acquires predetermined information from another communication device that is a transmission destination of the bit sequences,
wherein the generation unit determines a number of the parity bit sequences to be generated based on the predetermined information.

(7)
The communication device according to any one of (1) to (6), further comprising:
 a transmission unit that transmits the plurality of bit sequences by using the plurality of channels to another communication device that starts decoding processing of the plurality of bit sequences even before completion of reception of all the plurality of bit sequences when a predetermined decoding start condition is satisfied; and
 a reception unit that receives a response indicating whether or not reception of the bit sequences has succeeded from the other communication device,
wherein, when the other communication device is determined to have satisfied the predetermined decoding start condition based on the response, the transmission unit stops transmission of the plurality of bit sequences.

(8)
The communication device according to any one of (1) to (6), further comprising
 a transmission unit that transmits the plurality of bit sequences by using the plurality of channels to another communication device that starts decoding processing of the plurality of bit sequences even before completion of reception of all the plurality of bit sequences,
wherein, when receiving a success notification of the decoding processing from the other communication device, the transmission unit stops transmission of the plurality of bit sequences.

(9)
The communication device according to any one of (1) to (8),
wherein the predetermined error correction coding method includes an error correction coding method of at least one of an erasure code, a rateless code, a fountain code, a tornado code, a luby transform (LT) code, a Raptor code, a low density parity check (LDPC) code, a BCH code, a reed solomon (RS) code, and an exclusive OR (XOR) code.

(10)
A communication device that performs radio communication by using a plurality of channels, the communication device comprising:
an acquisition unit that acquires information on decoding processing of a plurality of bit sequences having different contents generated by applying coding processing based on a predetermined error correction coding method to a transmission data sequence;
a reception unit that receives at least one of the plurality of bit sequences distributed and transmitted to the plurality of channels; and
a decoding unit that performs the decoding processing on the transmission data sequence of at least one of the plurality of bit sequences that has been received based on the information on decoding processing.

(11)
The communication device according to (10), further comprising a start determination unit that determines whether or not to start the decoding processing based on a predetermined start criterion related to start of the decoding processing,
wherein, when the predetermined start criterion is satisfied, the decoding unit starts the decoding processing.

(12)
The communication device according to (11), further comprising
a decoding determination unit that determines whether or not the decoding processing has succeeded,
wherein, when the decoding processing does not succeed, the decoding unit executes the decoding processing by using more bit sequences than those in a case where the decoding processing does not succeed.

(13)
The communication device according to (11) or (12),
wherein the start determination unit determines whether or not to start the decoding processing based on the information on decoding processing.

(14)
The communication device according to any one of (11) to (13),
wherein the start determination unit determines whether or not to start the decoding processing based on whether or not a number of bit sequences received to date among the plurality of bit sequences has reached a predetermined number.

(15)
The communication device according to any one of (11) to (14), further comprising
a notification unit that notifies another communication device that has transmitted the bit sequences of success of the decoding processing regardless of whether or not the decoding processing has ended after it is determined to start the decoding processing.

(16)
The communication device according to (15),
wherein, when the transmission data sequence, from which the plurality of bit sequences has been generated, is data satisfying a predetermined criterion, the notification unit notifies the other communication device of success of the decoding processing regardless of whether or not the decoding processing has ended after it is determined to start the decoding processing.

(17)
The communication device according to (16),
wherein, when the transmission data sequence is user data, the notification unit notifies the other communication device of success of the decoding processing regardless of whether or not the decoding processing has ended after it is determined to start the decoding processing, and
when the transmission data sequence is control data, the notification unit notifies the other communication device of success of the decoding processing after the decoding processing succeeds.

(18)
A communication method of radio communication using a plurality of channels, the communication method comprising:
a generation unit that generates a plurality of bit sequences having different contents by applying coding processing based on a predetermined error correction coding method to a transmission data sequence; and
distributing the plurality of bit sequences to the plurality of channels.

(19)
A communication method of radio communication using a plurality of channels, the communication method comprising:
acquiring information on decoding processing of a plurality of bit sequences having different contents generated by applying coding processing based on a predetermined error correction coding method to a transmission data sequence;
receiving at least one of the plurality of bit sequences distributed and transmitted to the plurality of channels; and
performing the decoding processing on the transmission data sequence of at least one of the plurality of bit sequences that has been received based on the information on decoding processing.

(20)
A communication system comprising: a first communication device; and a second communication device, each of the first communication device and the second communication device being configured to perform radio communication by using a plurality of channels,
wherein the first communication device includes:
a generation unit that generates a plurality of bit sequences having different contents by applying coding processing based on a predetermined error correction coding method to a transmission data sequence; and
a distribution unit that distributes the plurality of bit sequences to the plurality of channels, and
the second communication device includes:
an acquisition unit that acquires information on decoding processing of a plurality of bit sequences;
a reception unit that receives at least one of the plurality of bit sequences distributed and transmitted to the plurality of channels; and a decoding unit that performs the decoding processing on the transmission data sequence of at least one of the plurality of bit sequences that has been received based on the information on decoding processing.

REFERENCE SIGNS LIST

1 Communication System
10 Management Device
20 Base Station
30 Relay Station
40 Terminal Device
11 Communication Unit
21, 31, 41 Radio Communication Unit
12, 22, 32, 42 Storage Unit
13, 23, 33, 43 Control Unit
211, 311, 411 Transmission Processing Unit
212, 312, 412 Reception Processing Unit
213, 313, 413 Antenna
231, 431 Reception Unit
232, 432 Transmission Unit
233, 433 Acquisition Unit
234, 434 Generation Unit
235, 435 Distribution Unit
236, 436 Start Determination Unit
237, 437 Decoding Unit
238, 438 Decoding Determination Unit

The invention claimed is:

1. A first communication device comprising:
a processor configured to:
generate a plurality of bit sequences having different contents, wherein the plurality of bit sequences is generated based on:
application of coding processing based on a specific error correction coding method to a transmission data sequence,
a plurality of source bit sequences generated based on division of the transmission data sequence, and
a plurality of parity bit sequences generated from the plurality of source bit sequences by using the specific error correction coding method; and
distribute the plurality of bit sequences to a plurality of channels, wherein the first communication device is configured to execute radio communication based on the plurality of channels.

2. The first communication device according to claim 1, wherein the processor is further configured to distribute the plurality of bit sequences to the plurality of channels based on a channel state of each of the plurality of channels.

3. The first communication device according to claim 1, wherein the processor is further configured to distribute the plurality of bit sequences to the plurality of channels based on an amount of delay until transmission of each of the plurality of channels.

4. The first communication device according to claim 1, wherein the processor is further configured to distribute the plurality of bit sequences to the plurality of channels based on an amount of a resource available for transmission of each of the plurality of channels.

5. The first communication device according to claim 1, wherein the processor is further configured to:
acquire specific information from a second communication device, wherein the second communication device is a transmission destination of the plurality of bit sequences; and
determine a number of the plurality of parity bit sequences generated based on the specific information.

6. The first communication device according to claim 1, wherein the processor is further configured to:
transmit the plurality of bit sequences by using the plurality of channels to a second communication device that starts decoding processing of the plurality of bit sequences even before completion of reception of all the plurality of bit sequences based on a determination that a specific decoding start condition is satisfied;
receive a response which indicates that the reception of the plurality of bit sequences has succeeded from the second communication device; and
stop the transmission of the plurality of bit sequences based on a determination that the second communication device satisfies the specific decoding start condition based on the received response.

7. The first communication device according to claim 1, wherein the processor is further configured to:
transmit the plurality of bit sequences by using the plurality of channels to a second communication device that starts decoding processing of the plurality of bit sequences even before completion of reception of each bit sequence of the plurality of bit sequences; and
stop transmission of the plurality of bit sequences based on reception of a success notification of the decoding processing from the second communication device.

8. The first communication device according to claim 1, wherein the specific error correction coding method includes an error correction coding method of at least one of an erasure code, a rateless code, a fountain code, a tornado code, a luby transform (LT) code, a Raptor code, a low density parity check (LDPC) code, a BCH code, a reed solomon (RS) code, and an exclusive OR (XOR) code.

9. A first communication device, comprising:
a processor configured to:
acquire information on decoding processing of a plurality of bit sequences having different contents, wherein
the plurality of bit sequences is generated by application of coding processing based on a specific error correction coding method to a transmission data sequence, and
the first communication device is configured to execute radio communication using a plurality of channels;
receive at least one of the plurality of bit sequences distributed and transmitted to the plurality of channels;
execute the decoding processing on the transmission data sequence of at least one of the plurality of bit sequences that has been received based on the information on decoding processing;
determine a status of success of the decoding processing based on the execution; and
execute, based on a determination that the decoding processing does not succeed, the decoding processing by using an increased number of bit sequences than those when the decoding processing does not succeed.

10. The first communication device according to claim 9, wherein the processor is further configured to:
   determine start of the decoding processing based on a specific start criterion related to start of the decoding processing; and
   start the decoding processing based on a satisfaction of the specific start criterion.

11. The first communication device according to claim 10, wherein the processor is further configured to determine a start of the decoding processing based on the information on decoding processing.

12. The first communication device according to claim 10, wherein the processor is further configured to determine a start of the decoding processing based on a determination that a number of bit sequences received to date among the plurality of bit sequences has reached a specific number.

13. The first communication device according to claim 10, wherein the processor is further configured to control notification to a second communication device that has transmitted a number of bit sequences of success of the decoding processing regardless of an end of the decoding processing after it is determined to start the decoding processing.

14. The first communication device according to claim 13, wherein, based on a determination that the transmission data sequence, from which the plurality of bit sequences has been generated, is data which satisfies specific criterion, the processor is further configured to control notification to the second communication device of success of the decoding processing regardless of an end of the decoding processing after it is determined to start the decoding processing.

15. The first communication device according to claim 14, wherein the processor is further configured to
   control notification to the second communication device of success of the decoding processing regardless of the end of the decoding processing after it is determined to start the decoding processing, based on a determination that the transmission data sequence is user data; and
   control notification to the second communication device of success of the decoding processing after the decoding processing succeeds, based on a determination that the transmission data sequence is control data.

16. A communication method, comprising:
for radio communication using a plurality of channels,
generating a plurality of bit sequences having different contents, wherein the plurality of bit sequences is generated based on:
   application of coding processing based on a specific error correction coding method to a transmission data sequence,
   a plurality of source bit sequences generated based on division of the transmission data sequence, and
   a plurality of parity bit sequences generated from the plurality of source bit sequences by using the specific error correction coding method; and
distributing the plurality of bit sequences to the plurality of channels.

17. A communication method, comprising:
for radio communication using a plurality of channels,
acquiring information on decoding processing of a plurality of bit sequences having different contents, wherein
   the plurality of bit sequences is generated by application of coding processing based on a specific error correction coding method to a transmission data sequence;
receiving at least one of the plurality of bit sequences distributed and transmitted to the plurality of channels;
executing the decoding processing on the transmission data sequence of at least one of the plurality of bit sequences that has been received based on the information on decoding processing;
determining a status of success of the decoding processing based on the execution; and
executing, based on a determination that the decoding processing does not succeed, the decoding processing by using an increased number of bit sequences that those when the decoding processing does not succeed.

18. A communication system, comprising:
a first communication device; and
a second communication device, wherein
   each of the first communication device and the second communication device are configured to execute radio communication by using a plurality of channels,
   the first communication device includes a first processor configured to:
   generate a plurality of bit sequences having different contents, wherein the plurality of bit sequences is generated based on:
      application of coding processing based on a specific error correction coding method to a transmission data sequence,
      a plurality of source bit sequences generated based on division of the transmission data sequence, and
      a plurality of parity bit sequences generated from the plurality of source bit sequences by using the specific error correction coding method; and
   distribute the plurality of bit sequences to the plurality of channels; and
the second communication device includes a second processor configured to:
   acquire information on decoding processing of a plurality of bit sequences;
   receive at least one of the plurality of bit sequences distributed and transmitted to the plurality of channels; and
   execute the decoding processing on the transmission data sequence of at least one of the plurality of bit sequences that has been received based on the information on decoding processing.

* * * * *